US012544232B2

United States Patent
Gutierrez et al.

(10) Patent No.: US 12,544,232 B2
(45) Date of Patent: Feb. 10, 2026

(54) ORTHOPEDIC COMPONENTS

(71) Applicant: Encore Medical, L.P., Austin, TX (US)

(72) Inventors: Sergio Gutierrez, Tampa, FL (US); Joseph P. Iannotti, Cleveland, OH (US); Mark A. Frankle, Tampa, FL (US); Gerald Williams, Philadelphia, PA (US); Thomas Bradley Edwards, Houston, TX (US); Jonathan Levy, Overland Park, FL (US); Joseph A. Abboud, Philadelphia, PA (US)

(73) Assignee: Encore Medical, L.P., Austin, TX (US)

( * ) Notice: Subject to any disclaimer, the term of this patent is extended or adjusted under 35 U.S.C. 154(b) by 108 days.

(21) Appl. No.: 18/568,272

(22) PCT Filed: Jun. 10, 2022

(86) PCT No.: PCT/US2022/033120
§ 371 (c)(1),
(2) Date: Dec. 7, 2023

(87) PCT Pub. No.: WO2022/261508
PCT Pub. Date: Dec. 15, 2022

(65) Prior Publication Data
US 2024/0285411 A1 Aug. 29, 2024

Related U.S. Application Data

(60) Provisional application No. 63/209,845, filed on Jun. 11, 2021.

(51) Int. Cl.
*A61B 17/72* (2006.01)
*A61F 2/40* (2006.01)
*A61F 2/30* (2006.01)

(52) U.S. Cl.
CPC .. *A61F 2/4014* (2013.01); *A61F 2002/30476* (2013.01)

(58) Field of Classification Search
CPC .......... A61F 2/4014; A61F 2002/4022; A61B 17/80; A61B 17/72; A61B 17/7233; A61B 17/68
(Continued)

(56) References Cited

U.S. PATENT DOCUMENTS 11,413,153 B2 * 8/2022 Zhu ...................... A61F 2/3672
2007/0225819 A1 9/2007 Eva
(Continued)

FOREIGN PATENT DOCUMENTS

| CN | 212281780 U | 1/2021 |
| EP | 0321389 A1 | 6/1989 |
| GB | 2534140 A | 7/2016 |

OTHER PUBLICATIONS

International Search Report and Written Opinion of International Searching Authority for Application No. PCT/US2022/033120, mailed Sep. 1, 2022 (15 pages).

*Primary Examiner* — Eduardo C Robert
*Assistant Examiner* — Christina Negrellirodriguez
(74) *Attorney, Agent, or Firm* — Nixon Peabody LLP

(57) ABSTRACT

In some embodiments, apparatuses and methods are provided herein useful to orthopedic components. In some embodiments, an orthopedic component comprises a stem portion including a proximal end and a distal end, wherein the stem portion is configured to be inserted into a bone, an anatomical portion located at the proximal end of the stem portion, and a plate extending away from the stem portion such that a gap exists between the plate and the stem portion, wherein at least a portion of the plate extends toward the distal end of the stem portion.

16 Claims, 37 Drawing Sheets

(58) Field of Classification Search
USPC .................................... 606/53, 62, 64, 280
See application file for complete search history.

(56) References Cited

U.S. PATENT DOCUMENTS

| | | |
|---|---|---|
| 2008/0177393 A1 | 7/2008 | Grant |
| 2014/0039633 A1 | 2/2014 | Roche |
| 2014/0114425 A1* | 4/2014 | Ekelund ................ A61F 2/4059 623/19.14 |
| 2015/0223940 A1 | 8/2015 | Papadonikolakis |
| 2017/0333197 A1 | 11/2017 | Roche |
| 2019/0117412 A1* | 4/2019 | Zimmerman ...... A61B 17/1668 |

* cited by examiner

ORTHOPEDIC COMPONENTS

CROSS-REFERENCE TO RELATED APPLICATION

This application is a U.S. National Stage of International Application No. PCT/US2022/033120, filed Jun. 10, 2022, which claims the benefit of and priority to U.S. Provisional Patent Application No. 63/209,845, filed Jun. 11, 2021, each of which is hereby incorporated by reference herein in its entirety.

TECHNICAL FIELD

This invention relates generally to orthopedics and, more specifically, a prosthesis for use in orthopedics.

BACKGROUND

The human shoulder is a ball-and-socket type joint that provides the greatest range of motion in the body. The ball, comprising the superior end or head of the humerus, rests against the glenoid fossa, a shallow socket in the scapula, and is held in place by muscles and other soft tissue. In a healthy joint, the rotator cuff muscles, including the supraspinatus, help to balance the head of the humerus in the glenoid socket against the upward pull of the deltoid muscle. When the joint is healthy, the head of the humerus moves smoothly in the glenoid socket. However, arthritis, bone disease, or injury can radically affect the smooth functioning of the shoulder joint and can necessitate that the joint be repaired or reconstructed in a procedure in which a prosthetic humeral stem is inserted into the humerus for cooperation with the natural glenoid socket or with a prosthesis that is attached to the glenoid fossa.

Some conditions, such as rotator cuff arthropathy, and the failure of a prior hemi-arthroplasty or acromioplasty along with superior escape of the humerus, can make repair or reconstruction that maintains the normal relationship between the "ball" and the "socket" of the joint impossible. Under these circumstances, repair or reconstruction of the joint using a "reverse" prosthesis which employs a socket where the ball (head of the humerus) is normally located and a ball where the socket (glenoid fossa) is usually located may be the only option. Such repair or reconstruction can restore some degree of function to the damaged joint by providing stability and a fulcrum against which the deltoid muscle can help to elevate the humerus to a level where some basic shoulder functions can be performed.

In some circumstances, the proximal (or upper) part of the humerus is so damaged that it is difficult to place a humeral stem deep enough therein to provide the required stability and the necessary physical orientation for proper mechanical functioning of the artificial joint. In such cases, it is often necessary for the surgeon to add a bone graft of cadaver bone that must be cut and shaped during the surgery to provide the necessary additional bony structure. However, bone grafts are expensive and are difficult to properly shape. In addition, many surgeons are not comfortable that they have the necessary skills to properly shape bone grafts during surgery. If bone grafts are required in a conventional surgical procedure, it is often difficult to revise or reverse the joint repair if subsequent conditions indicate that the original repair has failed.

It would be desirable if a prosthetic component were available that would provide a greater degree of normal function to a shoulder joint that includes damage to the proximal part of the humerus. It would also be desirable if such a prosthetic component could be provided that would obviate the need for adding bone graft material when there is significant bone loss in the proximal end of the humerus. It would also be desirable if a prosthetic component could be provided that would allow repair of the joint with a high degree of stability.

Additional objects and advantages of this invention will become apparent from an examination of the drawings and the ensuing description.

BRIEF DESCRIPTION OF THE DRAWINGS

Disclosed herein are embodiments of systems, apparatuses, and methods pertaining orthopedic components. This description includes drawings, wherein.

Figure 1:
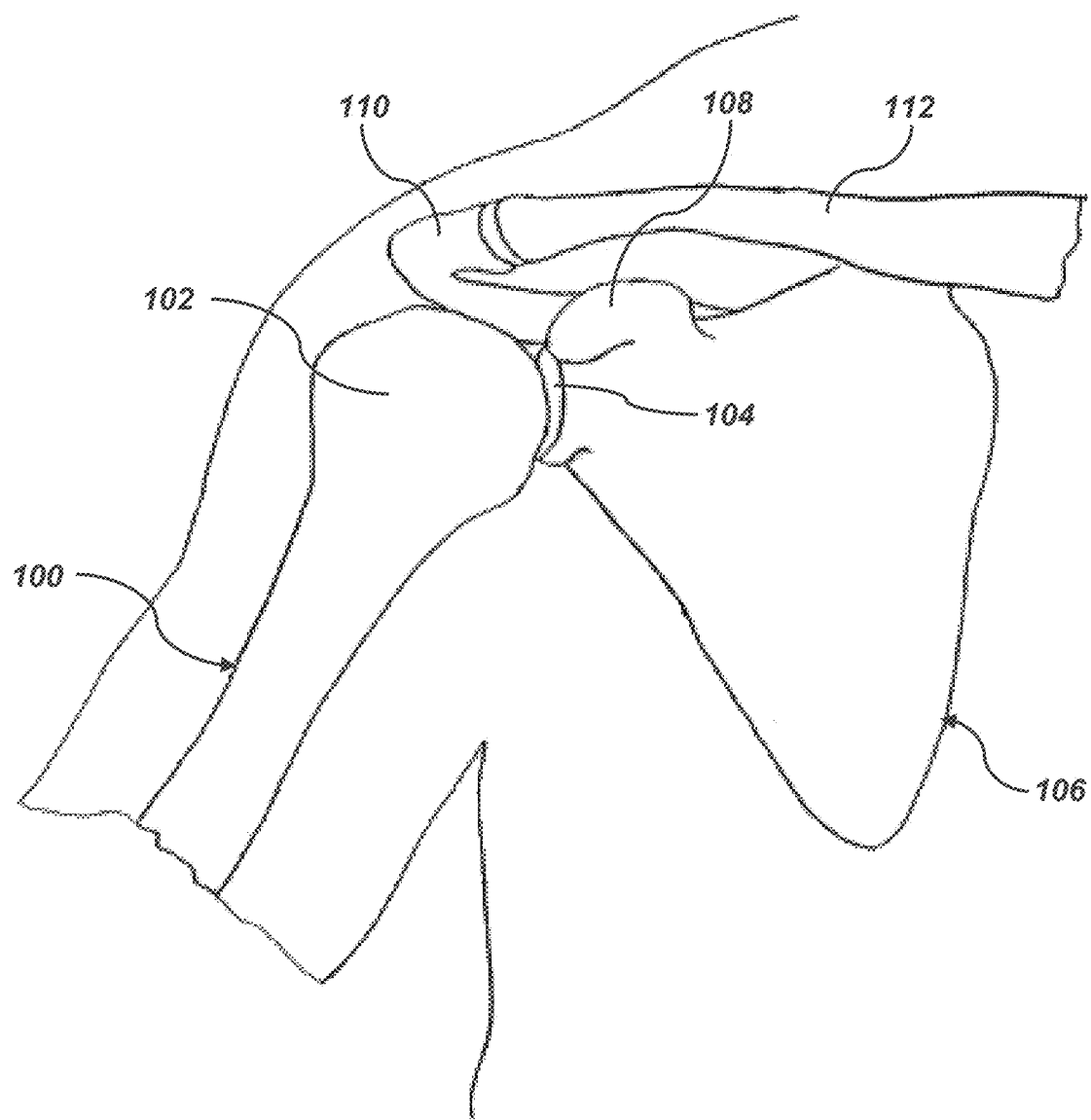
FIG. 1 is an illustration of the anterior view of the bones of anormal human shoulder joint, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

Generally speaking, pursuant to various embodiments, systems, apparatuses, and methods are provided herein useful to orthopedic components. In some embodiments, an orthopedic component comprises a stem portion including a proximal end and a distal end, wherein the stem portion is configured to be inserted into a bone, an anatomical portion located at the proximal end of the stem portion, and a plate extending away from the stem portion such that a gap exists between the plate and the stem portion, wherein at least a portion of the plate extends toward the distal end of the stem portion.

Described herein is an orthopedic component of a prosthetic assembly for use in repairing or reconstructing a joint between a humerus and a scapula. Though the orthopedic component described herein is referred to as a "humeral component" for use in reconstructing a joint between a humerus and a scapula, embodiments are not so limited. For example, the orthopedic component described herein can be used for any suitable joint. The orthopedic component cooperates with a ball portion of a glenoid component that is adapted for attachment to the scapula. In some embodiments, the orthopedic component comprises a stem portion, a cup portion, and a plate that is attached to the cup portion. The cup portion is adapted to receive the ball portion of the glenoid component and is attached to the stem portion. The plate is attached to the cup portion and disposed outwardly thereof. The plate also has an outer surface that is spaced therefrom and contoured so that tissue may be placed thereover.

In order to facilitate an understanding of the present disclosure, the preferred embodiments of the present disclosure are illustrated in the drawings, and a detailed description thereof follows. It is not intended, however, that the present disclosure be limited to the particular embodiments described or to use in connection with the apparatus illustrated herein. Various modifications and alternative embodiments such as would ordinarily occur to one skilled in the art to which the present disclosure relates are also contemplated and included within the scope of the present disclosure described and claimed herein.

Among the advantages of some embodiments of the orthopedic component is that they provide a prosthetic component that supports certain muscles of the shoulder in such a way that normal joint functions can be maintained. Another advantage of some embodiments of the orthopedic component is that they provide a prosthesis that can be used to repair a shoulder joint when there is significant bone loss in the proximal end of the humerus. Still another advantage of some embodiments of the orthopedic component is that they provide a prosthesis that can be used to repair a shoulder joint without the need for adding bone graft material when there is bone loss in the proximal end of the humerus. Yet another advantage of some embodiments of the orthopedic component is that they allow for repair of the joint with a high degree of stability.

The following detailed description and the appended drawings describe and illustrate various exemplary machine learning systems, methods, and components. The description and drawings are exemplary in nature and are provided to enable one skilled in the art to make and use one or more exemplary machine learning systems and/or components, and/or practice one or more exemplary methods. They are not intended to limit the scope of the claims in any manner.

The use of "e.g.," "etc.," "for instance," "in example," and "or" and grammatically related terms indicates non-exclusive alternatives without limitation, unless otherwise noted. The use of "optionally" and grammatically related terms means that the subsequently described element, event, feature, or circumstance may or may not be present/occur, and that the description includes instances where said element, event, feature, or circumstance occurs and instances where it does not. The use of "exemplary" refers to "an example of" and is not intended to convey a meaning of an ideal or preferred embodiment. The use of "attached" and "coupled" grammatically related terms refers to the fixed, releasable, or integrated association of two or more elements and/or devices with or without one or more other elements in between. Thus, the term "attached" or "coupled," and grammatically related terms, includes releasably attaching or fixedly attaching two or more elements and/or devices in the present or absence of one or more other elements in between. As used herein, the terms "proximal" and "distal" are used to describe opposing axial ends of the particular elements or features being described in relation to anatomical placement.

While the systems, methods, and components described herein are exemplified by systems and methods for humeral components, the systems, methods, and components described and illustrated herein can be used to treat any suitable ailment or joint within the body of an animal, including, but not limited to, humans. Skilled artisans will be able to select a suitable ailment and/or joint within the body of an animal to utilize a system and/or method described herein according to a particular embodiment based on various considerations, including the type of ailment and/or the structural arrangement at a treatment site. Example joints considered suitable to utilize a system, method, and/or component described herein include, but are not limited to, the shoulder joint, the elbow joint, the knee joint, the hip joint, and the ankle joint.

FIG. 1 is an anterior view of the bones of a normal human shoulder joint. As shown therein, humerus 100 includes head 102 that forms the "ball" portion of this ball-and-socket joint. The generally spherical humeral head 102 is in contact with the glenoid fossa 104 of a scapula 106 which forms the "socket" portion of the scapulohumeral (or shoulder) joint. The glenoid fossa is a cartilaginous cavity against which the humeral head slides and rotates. Located adjacent to the glenoid fossa is coracoid process 108. Other bones of the shoulder include the acromion 110 and the clavicle 112. The humerus 100 is held in place against the scapula 106 by passive suspension with the aid of various ligaments (not shown) and active suspension in which the rotator cuff muscles, including the supraspinatus, help to balance the head of the humerus in the glenoid socket against the upward pull of the deltoid muscle.

Arthritis, bone disease, or injury can radically affect the smooth functioning of the shoulder joint. In primary joint repair, the head of the humerus is typically removed, and a prosthetic stem is implanted into the humerus. A prosthetic ball is attached to this stem and a prosthetic socket is implanted in the glenoid fossa so as to articulate with the prosthetic ball. However, some conditions can make repair or reconstruction that maintains the normal spatial relationship between the "ball" and the "socket" of the joint impossible. Under these circumstances, repair or reconstruction of the joint using a "reverse" prosthesis which employs a socket where the head of the humerus is normally located and a ball where the glenoid fossa is usually located may be the only option.

Sometimes, bone disease or injury damages the proximal (or upper) part of the humerus to such an extent that it is difficult to place a humeral stem deep enough therein to provide the required stability and the necessary physical orientation for proper mechanical functioning of the artificial joint. In such cases, conventional practice requires the surgeon to add a bone graft of cadaver bone that must be cut and shaped during the surgery to provide the necessary additional bony structure to support the prosthetic components.

FIGS. 2-37 illustrate humeral components for use in a "reverse" type shoulder joint repair or reconstruction according to the invention so that certain of the muscles of the shoulder may be supported in such a way that normal joint functions can be maintained. Such components are adapted to cooperate with a ball portion of a glenoid component that is adapted for attachment to the scapula of the shoulder joint. These components may also be employed when there is significant damage to the proximal end of the humerus without requiring the addition of bone grafts to the humeral bone. Though FIGS. 2-37 depict a humeral component for use in a "reverse" type shoulder joint repair, embodiments are not so limited. In one embodiment, the humeral component can include a stem and a glenosphere. For example, the cup portion 208 of the humeral stem component 200 depicted in FIG. 2 can be replaced with a glenosphere.

Figure 2:
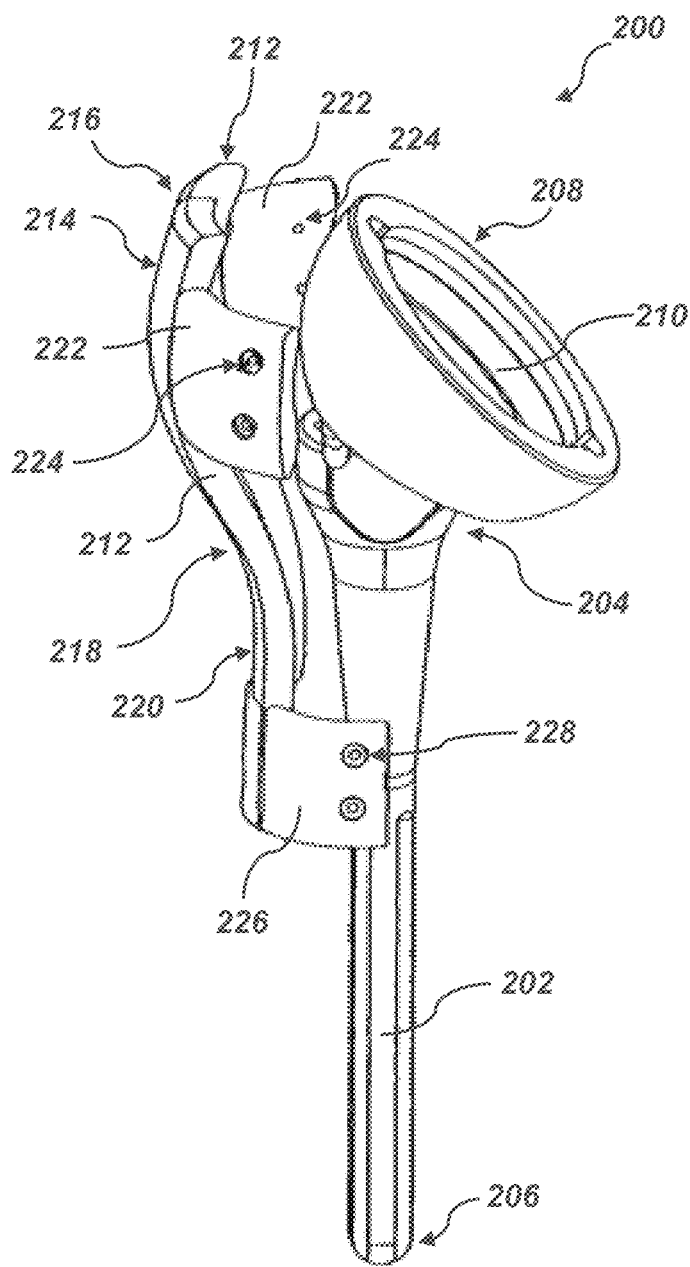
FIG. 2 is a first perspective view of a first embodiment of an orthopedic component, according to some embodiments.
Figure 3:
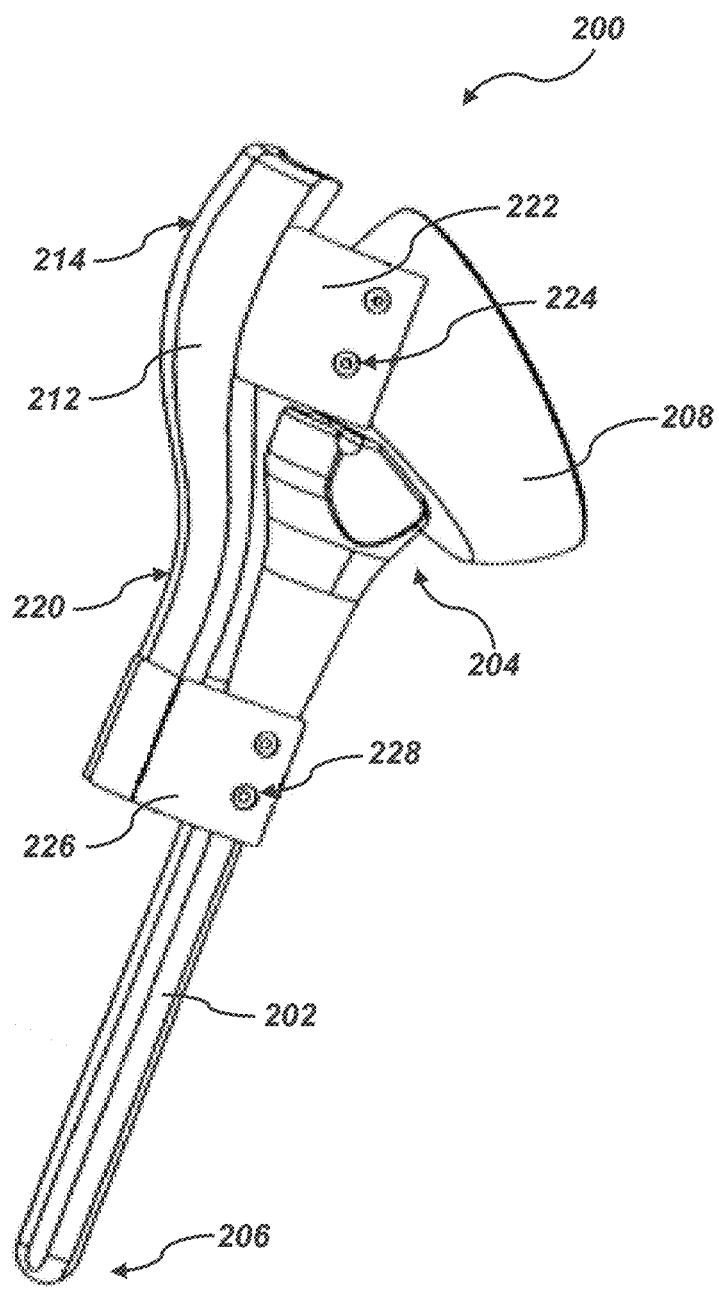
FIG. 3 is a second perspective view of the embodiment of the orthopedic component shown in FIG. 2, according to some embodiments.

A first embodiment of an orthopedic component is illustrated in FIGS. 2 and 3. In the example depicted in FIG. 2, the orthopedic component is a humeral component 200. The humeral component 200 includes stem portion 202 having a proximal end 204 and a distal end 206. In one embodiment, the stem portion 202 is comprised of a biocompatible metal, such as titanium. Attached to the proximal end 204 of the stem portion 202 is an anatomical portion. The anatomical portion is configured to mate with a corresponding structure (e.g., another prosthesis, a bone, etc.) In the example depicted in FIGS. 2 and 3, the anatomical portion is a cup portion 208. In this example, the cup portion 208 would be configured to mate with a prosthetic socket implanted in a glenoid of a patient. It should be noted, however, that embodiments are not so limited, and any suitable type of anatomical portion can be used. For example, the anatomical portion could be glenosphere. Where the anatomical portion is a glenosphere, the glenosphere may be configured to mate with a patient's bone or a prosthesis secured to the patient's bone. In the example depicted in FIGS. 2-3, the cup portion 208 includes a socket 210 that is adapted for receiving a ball portion of a glenoid component (not shown in FIGS. 2 and 3). Preferably, the cup portion 208 is comprised of a biocompatible metal. Socket 210 may be made of any suitable material (e.g., a ceramic or ultrahigh molecular weight polyethylene (UHMWPE) cup liner). Attached to the cup portion 208 and disposed outwardly thereof is a plate 212, preferably of biocompatible metal, which has an outer surface 214 that is spaced from the cup portion 208 and contoured so that a patient's tissue (not shown in FIGS. 2 and 3) may be placed thereover. In the example of a humeral component, the plate 212 may interact with a patient's deltoid muscle. The plate 212 can be of any suitable length. Accordingly, the plate 212 can extend down any desired portion of the stem portion 202. For example, the plate 212 can be about 10% of the length of the stem portion 202, about 20% of the length of the stem portion 202, about 30% of the length of the stem portion 202, about 50% of the length of the stem portion 202, about 75% of the length of the stem portion 202, about 100% of the length of the stem portion 202, etc. Additionally, in some embodiments, the length of the plate 212 can exceed the length of the stem portion 202.

In the embodiment of the orthopedic component illustrated in FIGS. 2 and 3, the proximal portion 216 of the plate 212 is curved laterally so as to be concave towards the cup portion. In this embodiment, the plate 212 is also curved longitudinally at its distal end 218, so that it describes an S-curve. In addition, the plate 212 includes a downwardly depending flange 220 and a pair of wings 222. In some embodiments, one or more of wings of the pair of wings 222 includes at least one attachment hole 224. Such attachment holes 224 can be used for suturing muscles or other tissues to humeral component 200. In some embodiments, the flange 220 also includes a pair of wings 226. In some embodiments, one or more wings of the pair of wings 226 includes at least one attachment hole 228. The at least one attachment hole 228 can be configured to, for example, receive screws or other fasteners (not shown) for attachment of the plate 212 to a portion of the humeral bone (not shown in FIGS. 2 and 3). In some embodiments, providing a humeral component which includes the plate 212 that is attached to cup portion 208 and configured and arranged so that the deltoid muscle can be placed thereover, the necessary physical orientation for proper mechanical functioning of the joint is maintained. In some embodiments, providing a plate 212 which includes wings 226 for attachment to a portion of the humeral bone somewhat removed from the joint, stability can be provided to the prosthetic joint without the need for the addition of bone graft material.

A second embodiment of an orthopedic component is illustrated in FIGS. 4-7. In the example depicted in FIGS. 4-7, the orthopedic component is a humeral component 230. The humeral component 230 includes a stem portion 260 (partially shown in FIG. 7) which is adapted to be inserted into a bone, such as a humerus 262, and cup portion 232. In one embodiment, the cup portion 232 is attached by tapered trunnion 234 to a corresponding tapered socket 264 in the proximal end of the stem portion 260. Preferably, the stem portion 260 and cup portion 232 of the humeral component 230 are comprised of a biocompatible metal. The humeral component 230 is adapted to cooperate with glenoid component 266 (shown in FIG. 7). In one embodiment, the glenoid component 266 is adapted to be attached to a scapula 268 using a plurality of fasteners 270. The glenoid component 266 includes a ball portion 272 that is adapted to articulate within the socket 236 of the cup portion 232. In some embodiments, the socket 236 includes a liner (e.g., a ceramic or polyethylene (e.g., ultra-high-molecular-weight polyethylene (UHMWPE) liner). A plate 238 is attached to the cup portion 232 of the humeral component 230 by a generally planar connecting wall 240. In some embodiments, the connecting wall 240 is arranged so that a diameter of the cup portion 232 lies within the plane of the connecting wall 240. In some embodiments, the connecting wall is comprised of the same material as the cup portion 232. In one form, the plate 238 is disposed outwardly of the cup portion 232 and has an outer surface 242 that is spaced from the cup portion 232 and contoured so that the deltoid muscle (not shown in FIGS. 4-7) may be placed thereover.

Figure 4:
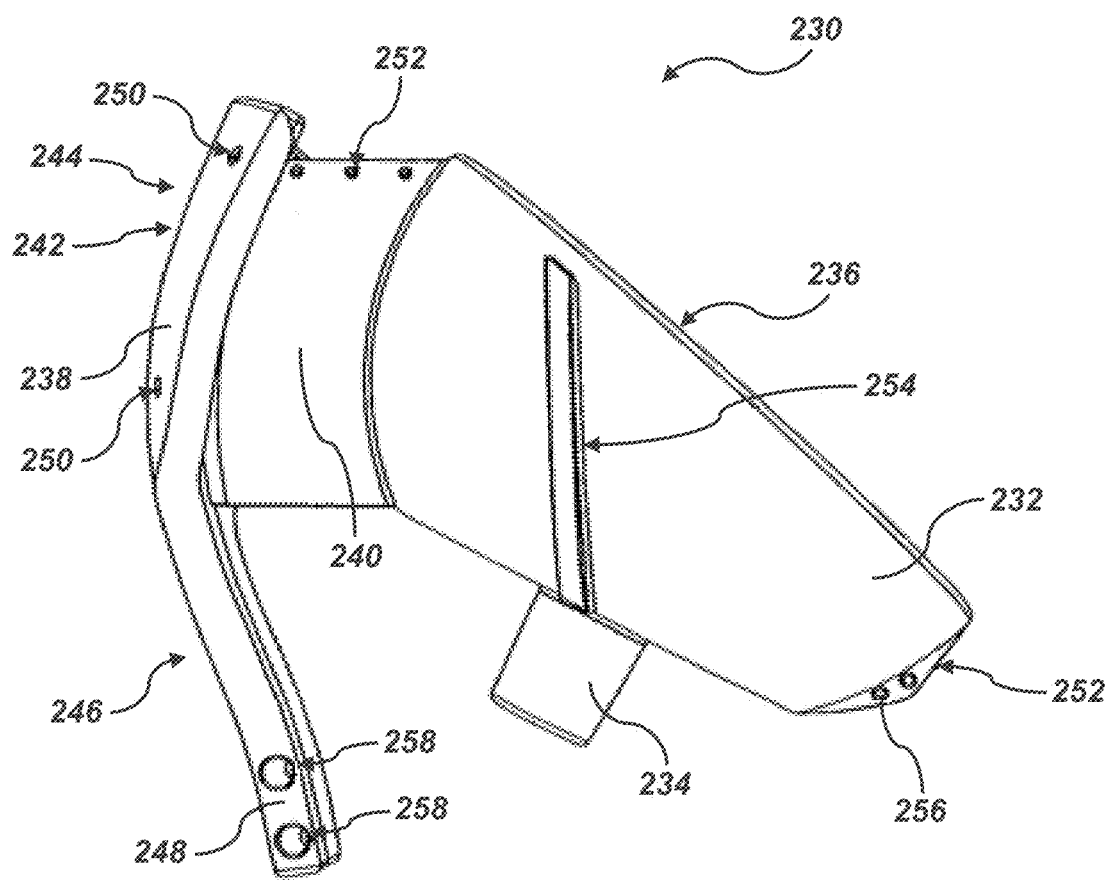
FIG. 4 is a side view of a second embodiment of an orthopedic component, according to some embodiments.
Figure 5:
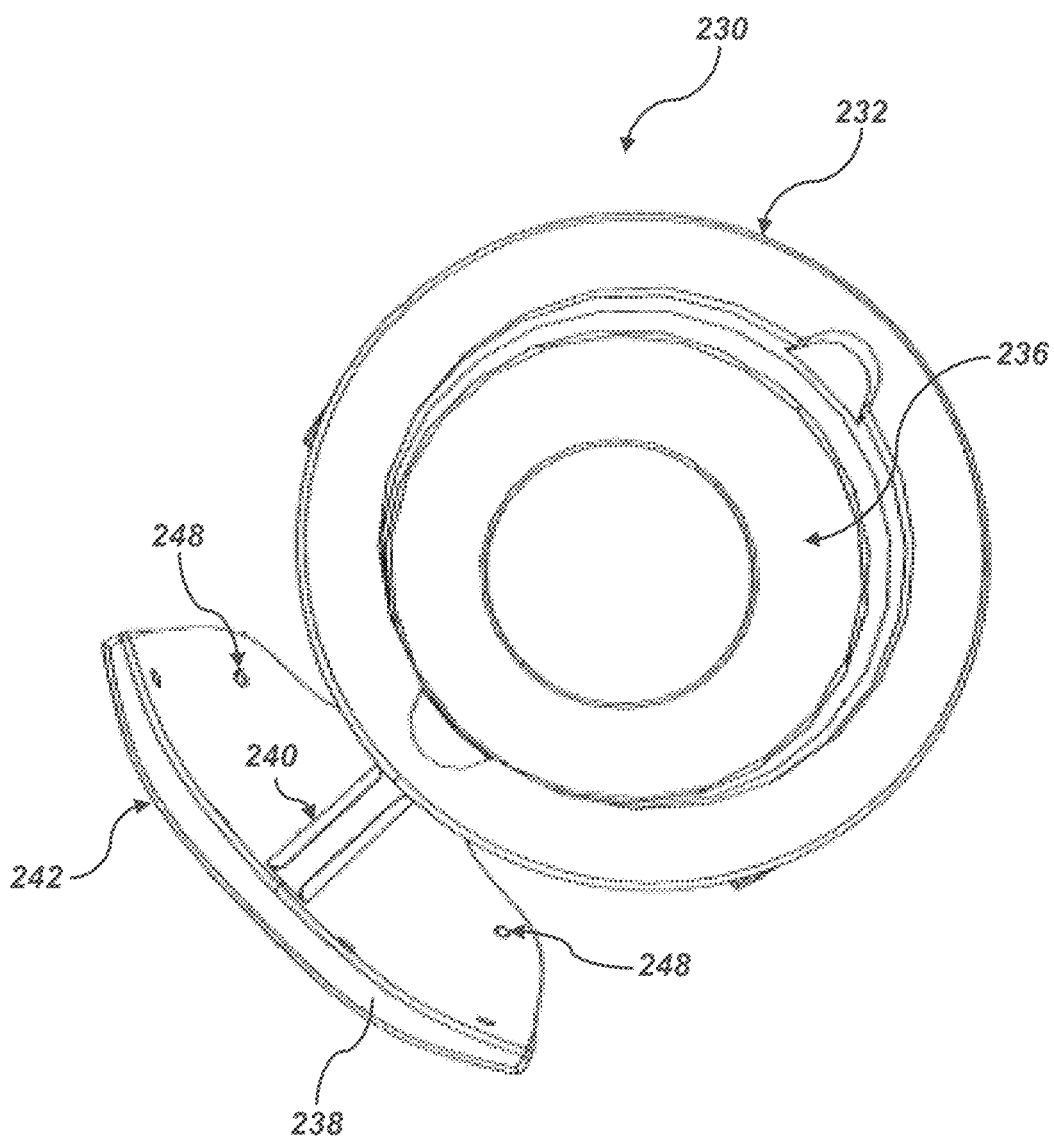
FIG. 5 is a top view of the embodiment of the orthopedic component illustrated in FIG. 4, according to some embodiments.
Figure 6:
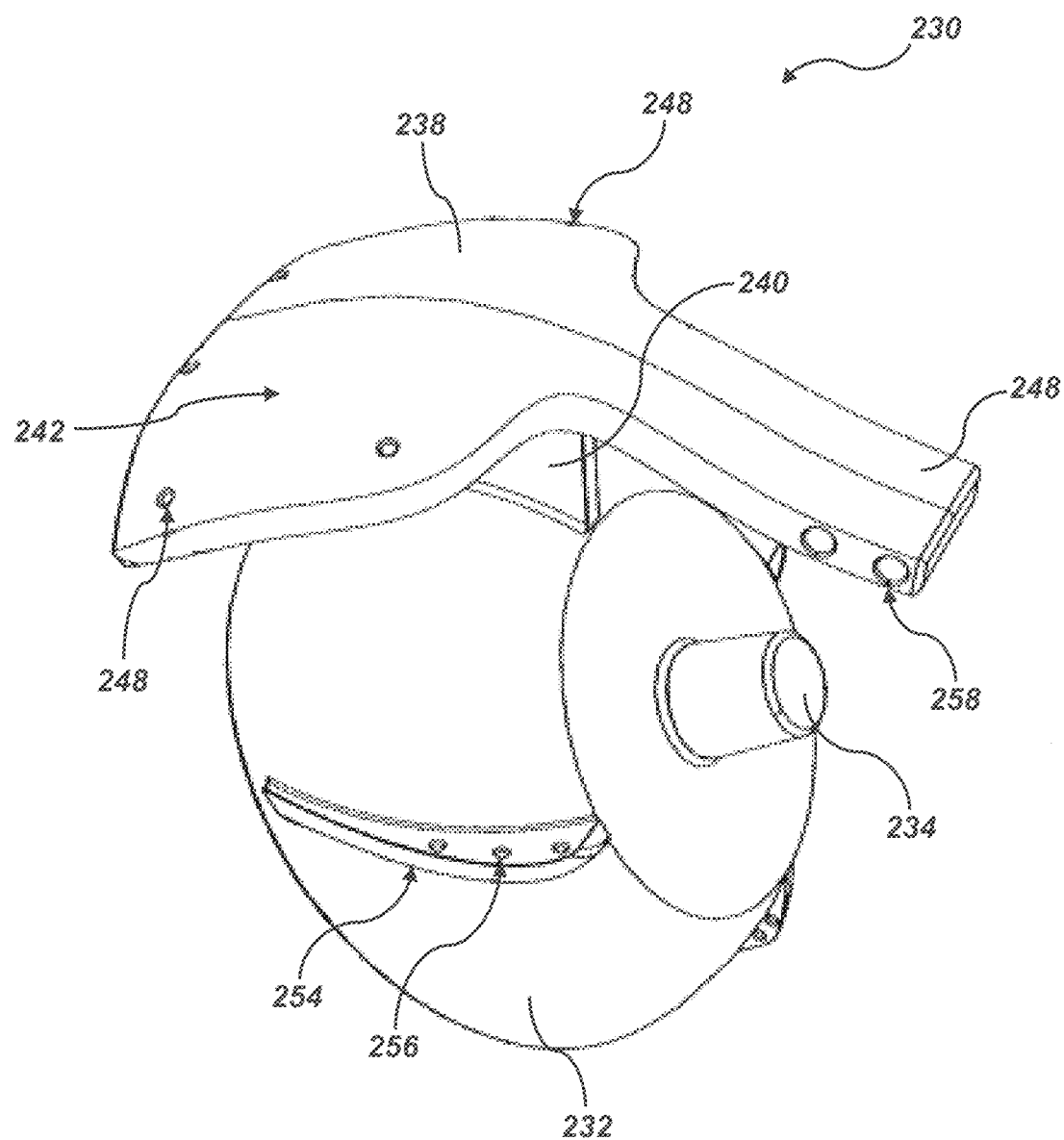
FIG. 6 is a perspective view of the embodiment of the orthopedic component shown in FIGS. 4 and 5, according to some embodiments.
Figure 7:
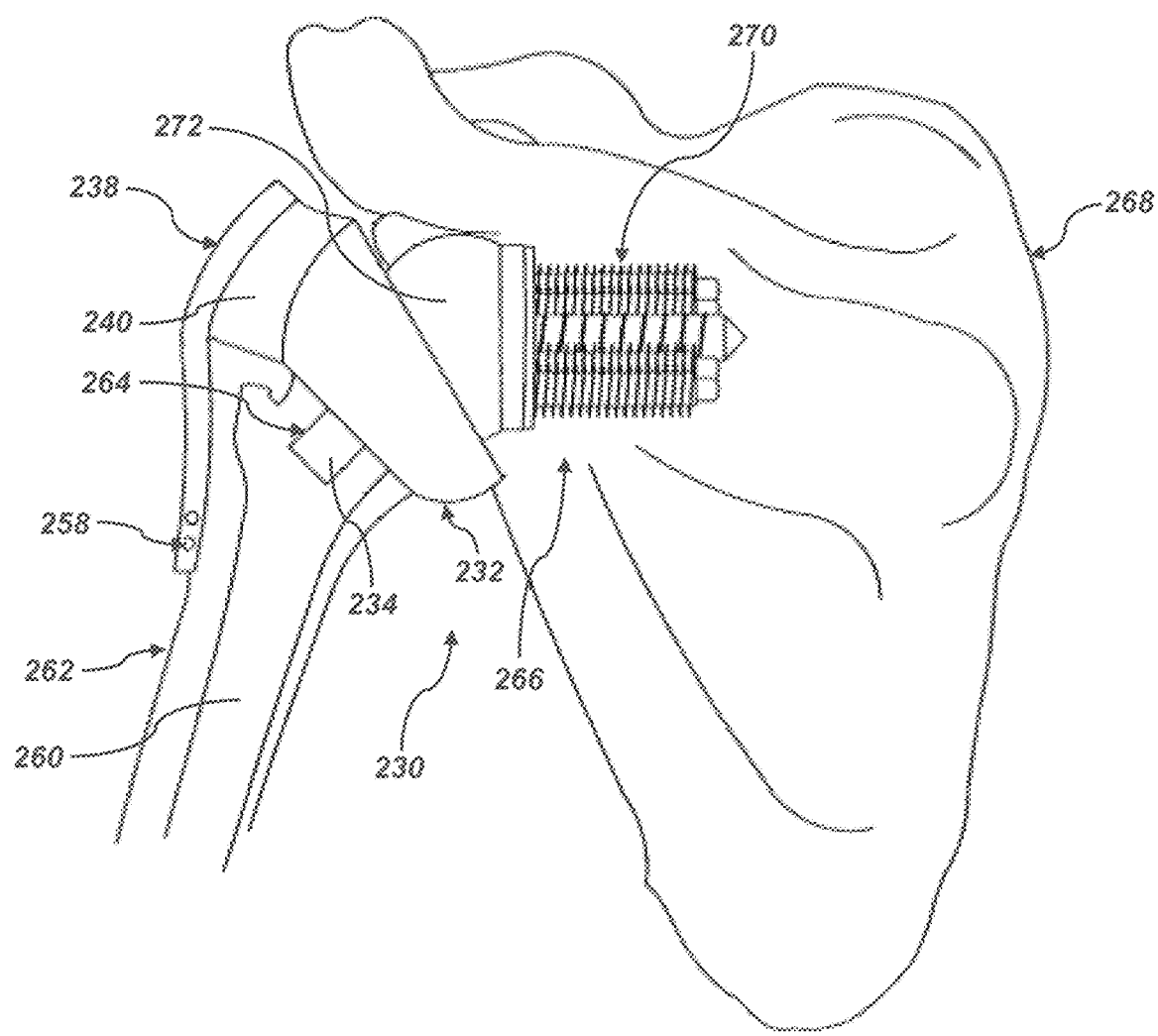
FIG. 7 is an illustration of a posterior view of the bones of a shoulder joint showing the implanted embodiment of the orthopedic component illustrated in FIGS. 4-6, according to some embodiments.

As best shown in FIG. 4, a proximal portion 244 of the plate 238 is curved laterally so as to be concave towards the cup portion 232. In some embodiments, the plate 238 is also curved longitudinally at its distal end 246, so that it describes an S-curve, and it terminates in a downwardly depending flange 248. In some embodiments, the plate 238 and connecting wall 240 include a plurality of attachment holes 250 and 252 respectively. The plurality of attachment holes 250 and 252 can be used, for example, in suturing muscles or other tissues to the humeral component 230. In addition, the cup portion 232 can include a plurality of suture sites 252, each of which includes at least one suture hole 256. Such suture sites 252 can be used, for example, in suturing muscles or other tissues to the humeral component 230. The flange 248 of the plate 238 can also include a attachment holes 258. The attachment holes 258 can be configured to, for example, receive wires or sutures (not shown in FIGS. 4-7) that may be wrapped around the humerus to secure the plate 238 thereto. Accordingly, in such embodiments, the flange 248 can include any suitable number of attachment holes 258. In some embodiments, a prosthetic assembly which includes a tissue support such as the plate 238 that is attached to cup portion 232 and configured and arranged so that tissue (e.g., muscle) can be placed thereover, provides the necessary physical orientation to maintain proper mechanical functioning of the joint. In some embodiments, a plate 238 which includes a flange 248 having attachment holes 258 for attachment to a portion of bone somewhat removed from the joint, provides stability to the prosthetic joint without the need for the addition of bone graft material.

Figure 8:
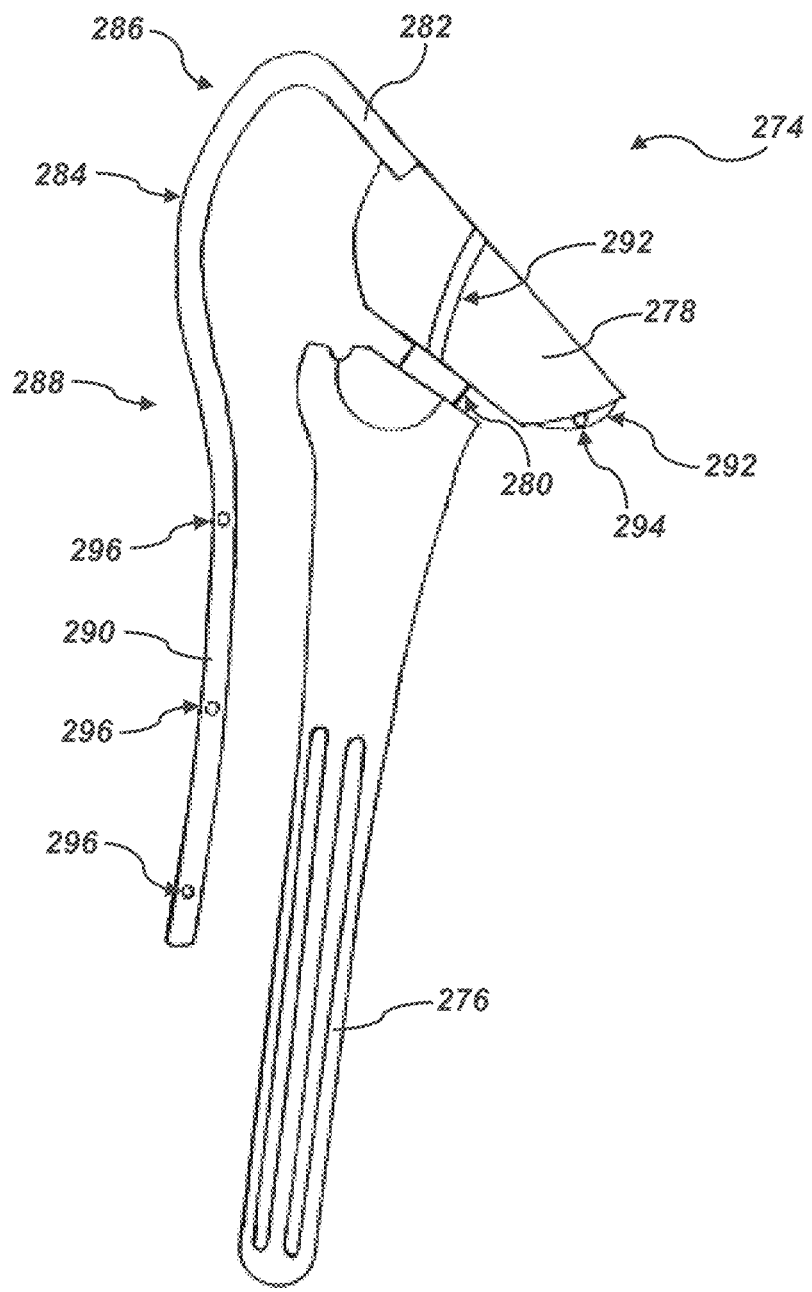
FIG. 8 is a side view of a third embodiment of an orthopedic component, according to some embodiments.
Figure 9:
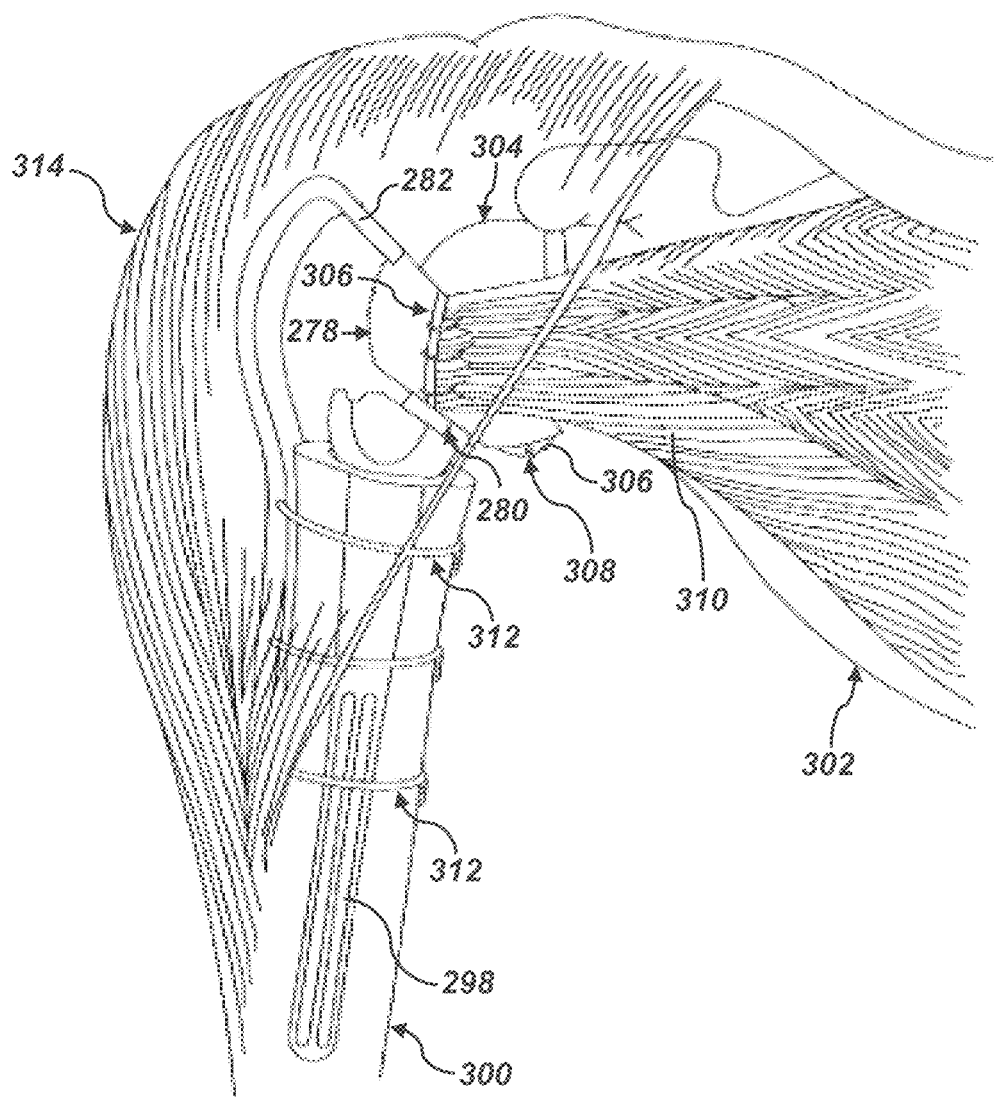
FIG. 9 is an illustration of an anterior view of a shoulder joint showing the implanted embodiment of the orthopedic component illustrated in FIG. 8, according to some embodiments.

A third embodiment of an orthopedic component is illustrated in FIGS. 8 and 9. In the example shown in FIGS. 8 and 9, the orthopedic component is a humeral component 274. The humeral component 274 includes a stem portion 276 which is adapted to be inserted into a humerus 300 (shown in FIG. 9). In some embodiments, the humeral component includes a cup portion 278. The cup portion 278 can be secured to the stem portion 276 in any suitable manner. For example, the cup portion 278 can be secured to the stem portion 276 via a tapered trunnion 280 to a corresponding tapered socket (not shown) in the proximal end of stem portion 276. In some embodiments, the stem portion 276 and the cup portion 278 are comprised of a biocompatible metal, such as titanium, stainless steel, cobalt-chromium, etc. In one form, the humeral component 274 is adapted to cooperate with a glenoid component that is adapted to be attached to scapula 302 using a plurality of fasteners (not shown). In one embodiment, the glenoid component includes a ball portion 304 that is adapted to articulate with a socket of cup portion 278 as shown in FIG. 9. The socket may be provided in the form of a cup liner. The cup liner can be made of any suitable material, such as ceramic, plastic (e.g., polyethylene), etc. The plate 282 is attached to the cup portion 278 and disposed outwardly of the cup portion 278 so that its outer surface 284 is spaced from the cup portion 278 and contoured so that deltoid muscle 314 (shown in FIG. 9) may be placed thereover. In one embodiment, the plate 282 is comprised of the same material as the cup portion.

In some embodiments, a proximal portion 286 of the plate 282 is curved laterally so as to be concave towards the cup portion 278. Additionally, in some embodiments, the plate 282 is also curved longitudinally at its distal end 288, so that it describes an S-curve, and it terminates in a downwardly depending flange 290. In one form, the cup portion 278 includes a plurality of suture sites 292, each of which includes at least one suture hole (such as hole 294 shown in FIG. 8) for use in suturing muscles (such as subscapularis muscle 310 shown in FIG. 9) or other tissues to the humeral component 274. In some embodiments, the flange 290 of the plate 282 also includes a plurality of attachment holes 296. The plurality of attachment holes 296 can be of any suitable number and, in some embodiments, are configured to receive wires 312 or sutures that may be wrapped around the humerus to secure the plate 282 thereto. In some embodiments, a prosthetic assembly which includes a tissue support such as the plate 282 that is attached to the cup portion 278 and configured and arranged so that the tissue (e.g., muscle) can be placed thereover, provides the necessary physical orientation to maintain proper mechanical functioning of the joint. In some embodiments, a plate 282 which includes a flange 290 having attachment holes 296 for attachment to portion of bone somewhat removed from the joint, provides stability to the prosthetic joint without the need for the addition of bone graft material.

Figure 10:
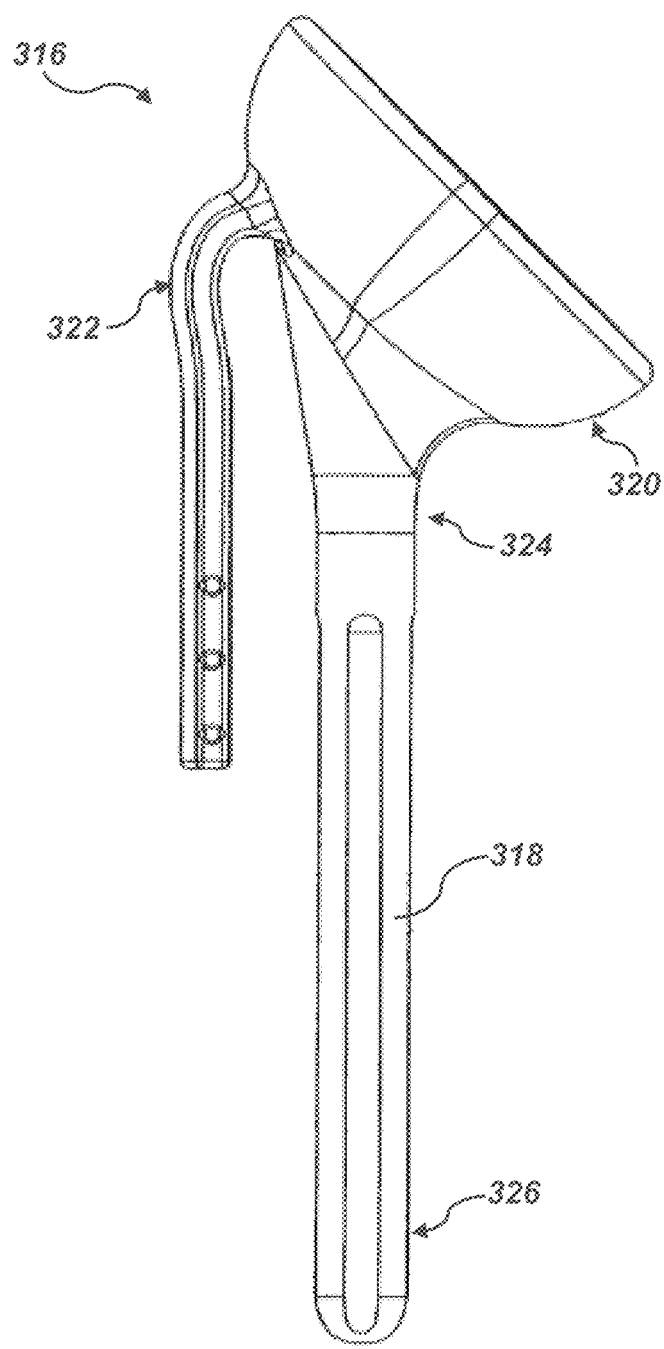
FIG. 10 is a side view of a fourth embodiment of an orthopedic component, according to some embodiments.
Figure 11:
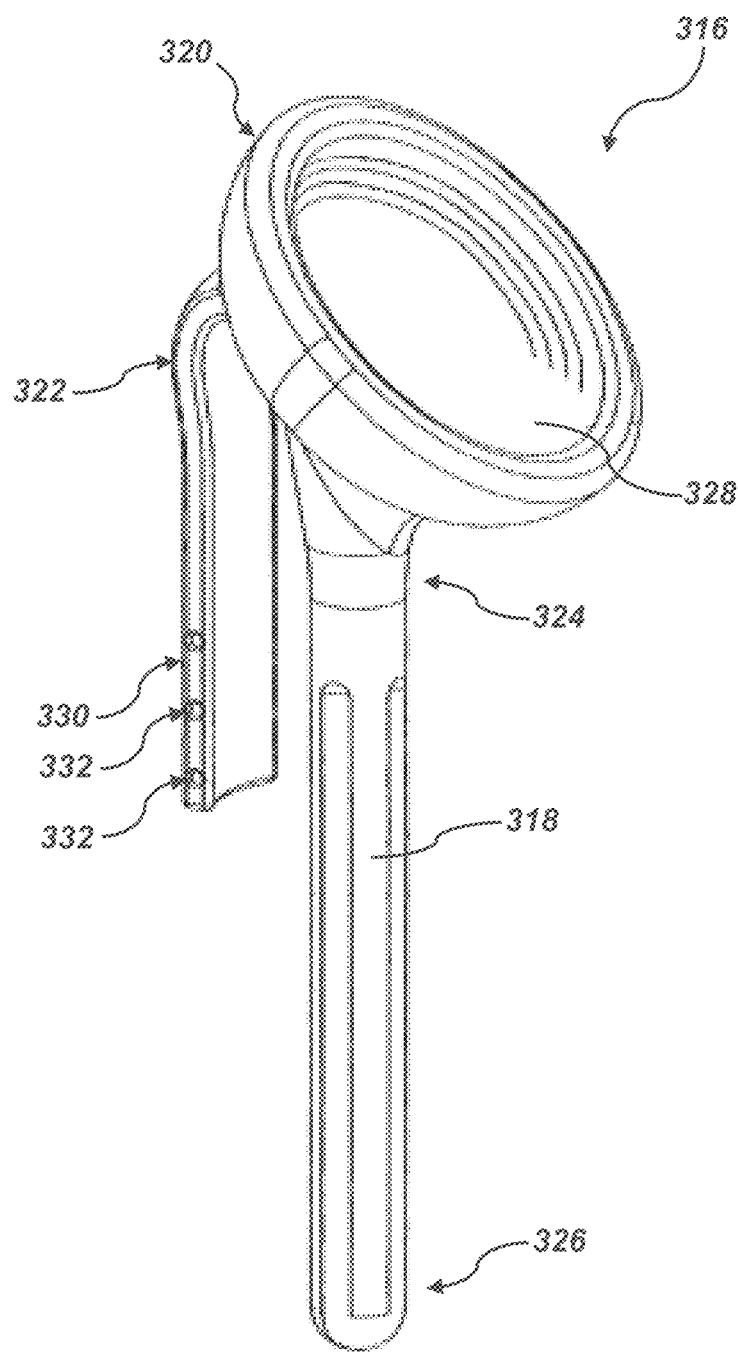
FIG. 11 is a perspective view of the embodiment of FIG. 10, according to some embodiments.
Figure 12:
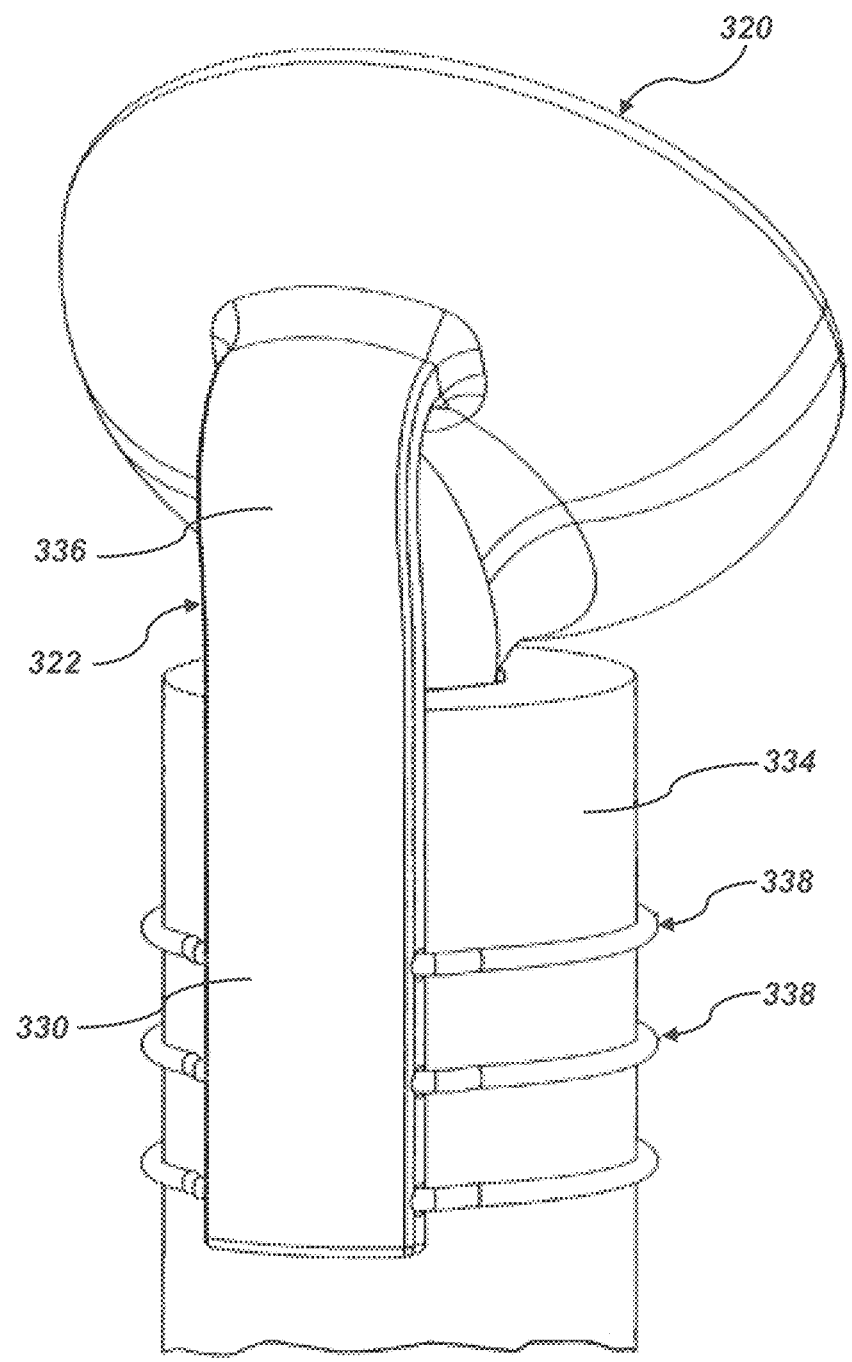
FIG. 12 is an illustration of a portion of a humeral bone showing the implanted embodiment of the orthopedic component illustrated in FIGS. 10 and 11, according to some embodiments.

A fourth embodiment of an orthopedic component is illustrated in FIGS. 10-12. As depicted in FIGS. 10-12, the orthopedic component is a humeral component 316. In some embodiments, the humeral component 316 is a unitary structure which includes a stem portion 318, a cup portion 320, and a plate 322. In one form, the humeral component 316 is comprised of a biocompatible metal. In some embodiments, as depicted in FIG. 10, the plate 322 is located opposite the cup portion 320. The stem portion 318 includes a proximal end 324, and a distal end 326 which is adapted to be inserted into a humerus 334 (shown in FIG. 12). The cup portion 320 includes a socket 328 (shown in FIG. 11) which is adapted to receive a ball portion of a cooperating glenoid component (not shown, but which can be substantially similar to ball portion 304 of FIG. 9). The socket 328 may include a liner. The liner can be made of any suitable material (e.g., ceramic, plastic, etc.) The plate 322 projects from the cup portion 320. In some embodiments, the plate 322 includes an outer surface 336 that is contoured. In such embodiments, this contour allows tissue (e.g. a muscle) to be placed thereover. In some embodiments, the proximal portion of the plate 322 includes a flange 330 that extends downwardly alongside part of the stem portion 318 (as best shown in FIG. 10). In such embodiments, the flange 330 preferably includes a plurality of attachment holes 332. The plurality of attachment holes can be of any suitable number and can be configured to receive wires 338 or sutures that may be wrapped around the bone to secure the plate 322 thereto. In some embodiments, a unitary humeral component which includes a tissue support such as the plate 322 that is integrally formed to the cup portion 320 and configured and arranged so that the tissue can be placed thereover, provides the necessary physical orientation such that proper mechanical functioning of the joint is maintained. In some embodiments, plate 332 which includes a flange 330 having attachment holes 332 for attachment to a position on the bone somewhat removed from the joint, provides stability to the prosthetic joint without the need for the addition of bone graft material.

Figure 13:
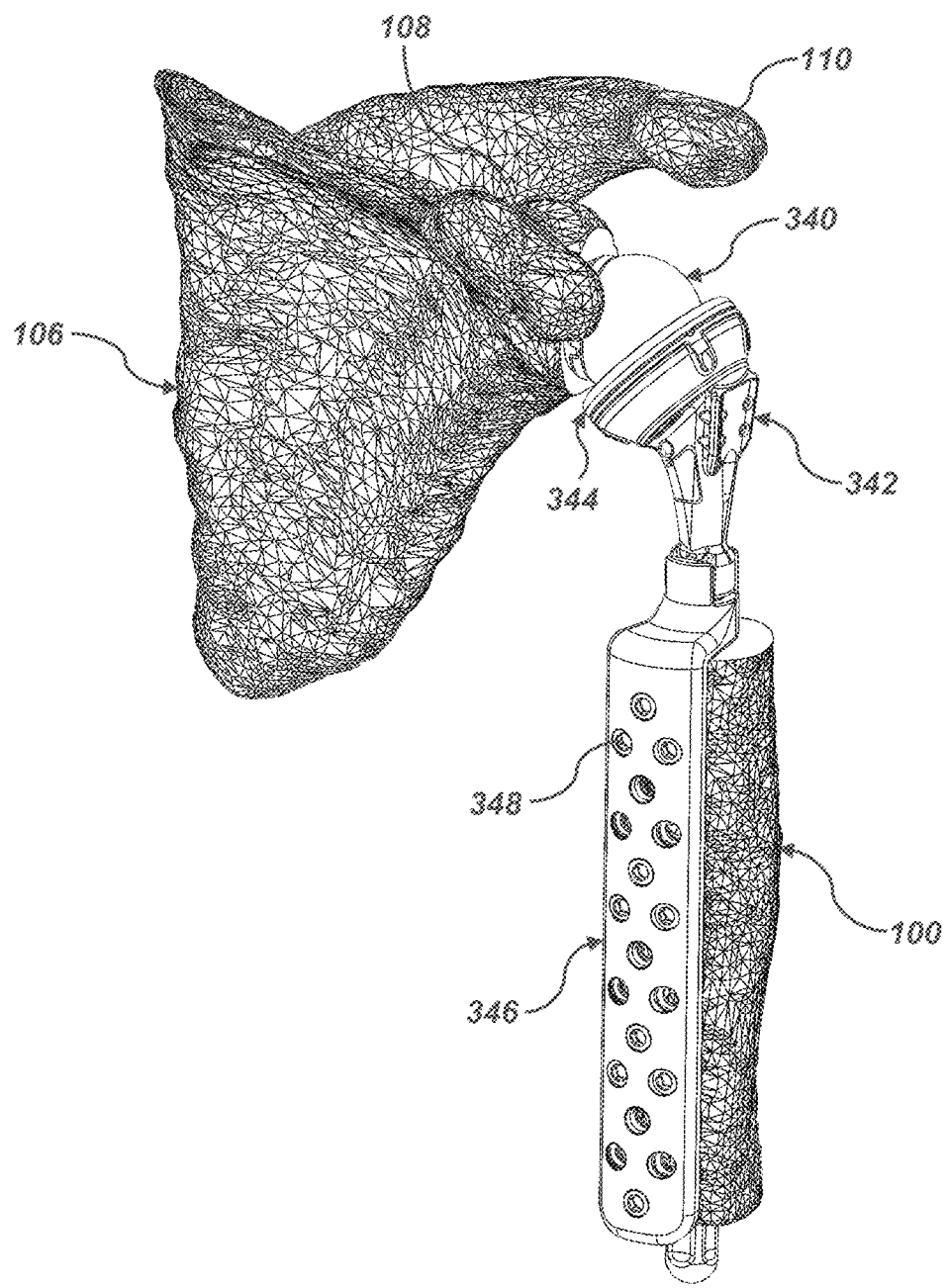
FIG. 13 is a perspective view of a shoulder joint illustrating a fifth embodiment of an orthopedic component, according to some embodiments.
Figure 14:
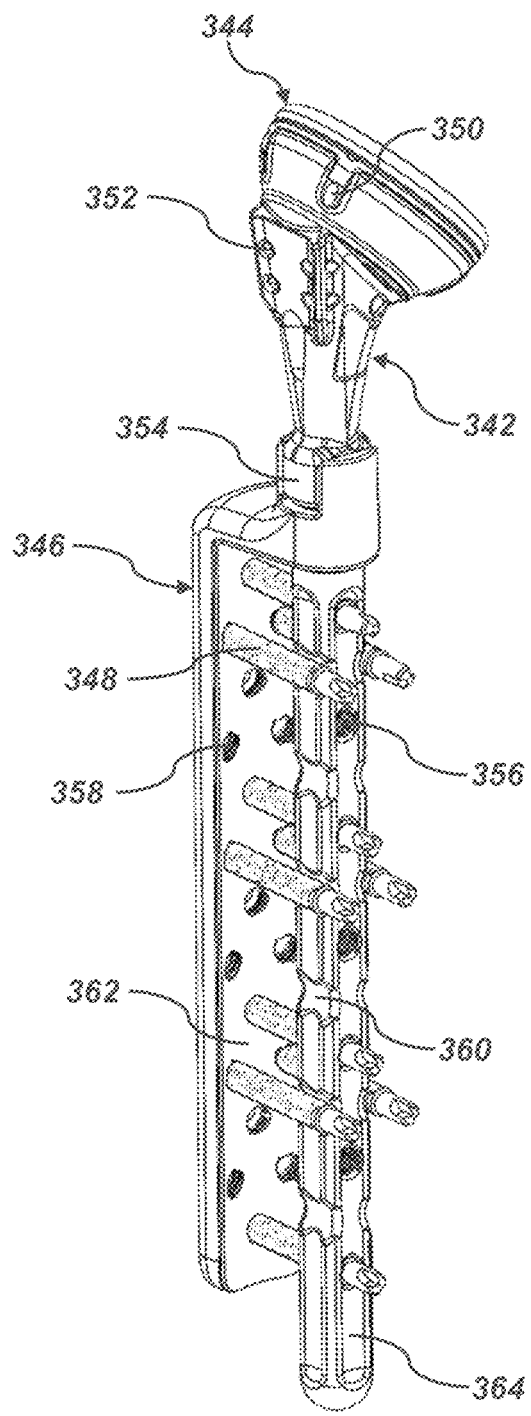
FIG. 14 is a perspective view of the embodiment shown in FIG. 13, according to some embodiments.
Figure 15:
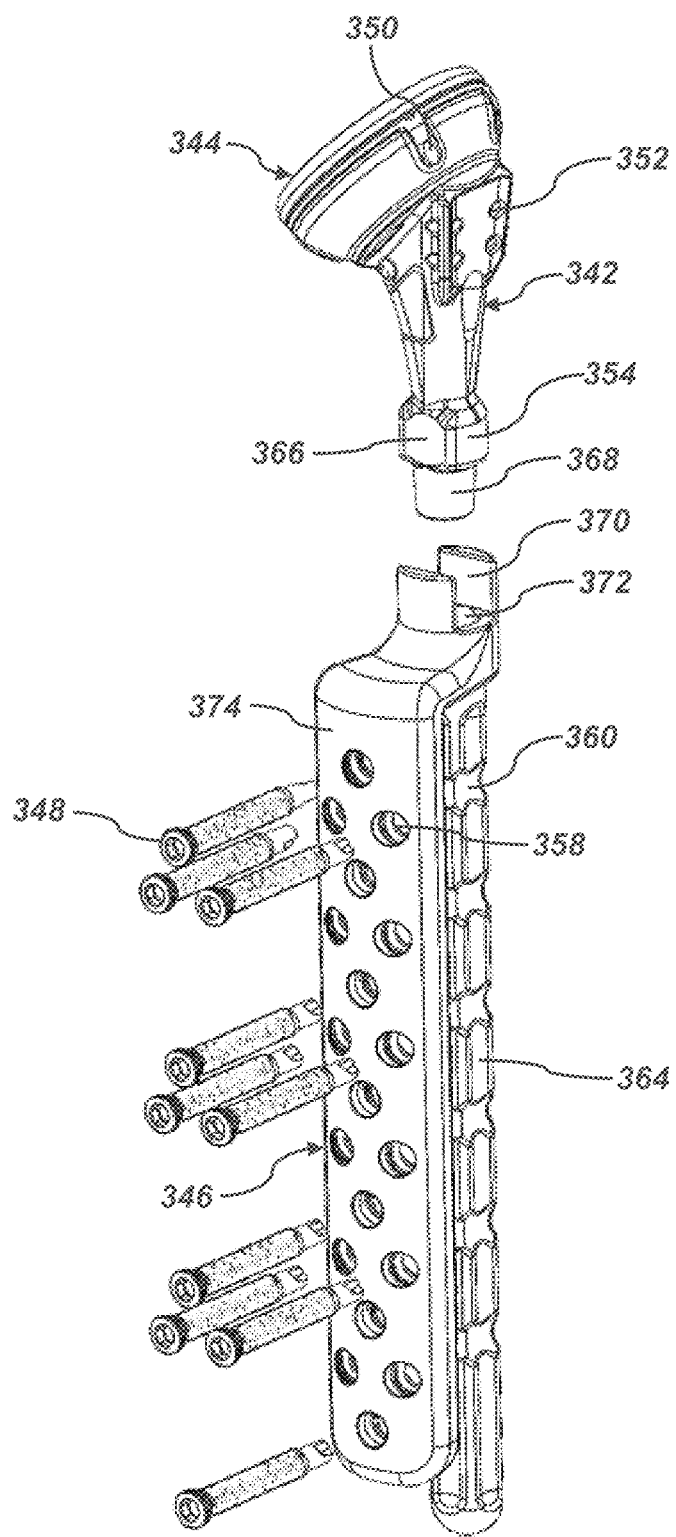
FIG. 15 is an exploded view of the embodiment shown in FIG. 13, according to some embodiments.

A fifth embodiment of an orthopedic component is illustrated in FIGS. 13-15. FIGS. 13-15 depict a shoulder joint that features a scapula 106 that includes the coracoid 108 and the acromion 110, and a portion of the humerus 100 representing severe proximal humeral bone loss. As depicted in FIGS. 13-15, the orthopedic component is a humeral component. In one embodiment, the humeral component includes a proximal humeral component 342, a cup component 344 that interfaces with a ball component 340, and a distal plate and stem component 346 with a plurality of fasteners 348. In one form, the proximal humeral component 342, and the distal plate and stem component 346 are comprised of a biocompatible metal. In one embodiment, the proximal humeral component 342 is adapted to cooperate with a glenoid component (not shown) that is adapted to be attached to scapula 106 using a plurality of fasteners (not shown). The glenoid component includes a ball portion 340 that is adapted to articulate with a socket of cup portion 344 as shown in FIG. 13. The socket may be provided in the form of a cup liner.

FIG. 14 shows a detailed view of the fifth embodiment of the orthopedic component. The proximal humeral component 342 has a cup component 344 that interfaces with a ball component (not shown). In one form, the features 350 and 352 attach various structures, including: bone fragments, tendons, ligaments, etc. using various attachment methods, including: sutures, cerclages, etc. The distal portion 354 of the proximal humeral component 342 is shaped to provide rotational stability when connected to the distal plate and stem component 346. The distal plate and stem component 346 consists of an inner plate portion 362 and a stem portion 364. In one embodiment, the one or both of the plate portion 362 includes holes 358 and the stem portion includes holes 356. The holes 362 and/or the holes 358 can be threaded or smooth to accept a plurality of fasteners 348 that can be locking or non-locking, respectively. Additionally, the stem portion 364 can include concave features 360 that allow the fasteners 348 to be placed along the outer edges of the stem portion 364.

FIG. 15 shows a detailed exploded view of the fifth embodiment of the orthopedic component. The proximal humeral component 342 includes a cup component 344 that interfaces with a ball component (not shown), and has features 350 and 352 to attach various structures, including: bone fragments, tendons, ligaments, etc. using various attachment methods, including: sutures, cerclages, etc. The distal portion 354 of the proximal humeral component 342 has a shape 366 that can provide rotational stability when connected to the distal plate and stem component 346 which has its corresponding shape 370. In one form, the proximal humeral component 342 has a distal tapered trunnion 368 that attaches to the distal plate and stem component 346 using a fastener, such as a proximal tapered socket 372. In the embodiment depicted in FIG. 15, the distal plate and stem component 346 consist of an outer plate portion 374 and a stem portion 364, where the plate portion 374 has concave features 360 that allow the fasteners 348 to be placed along the outer edges of the stem portion 364.

Figure 16:
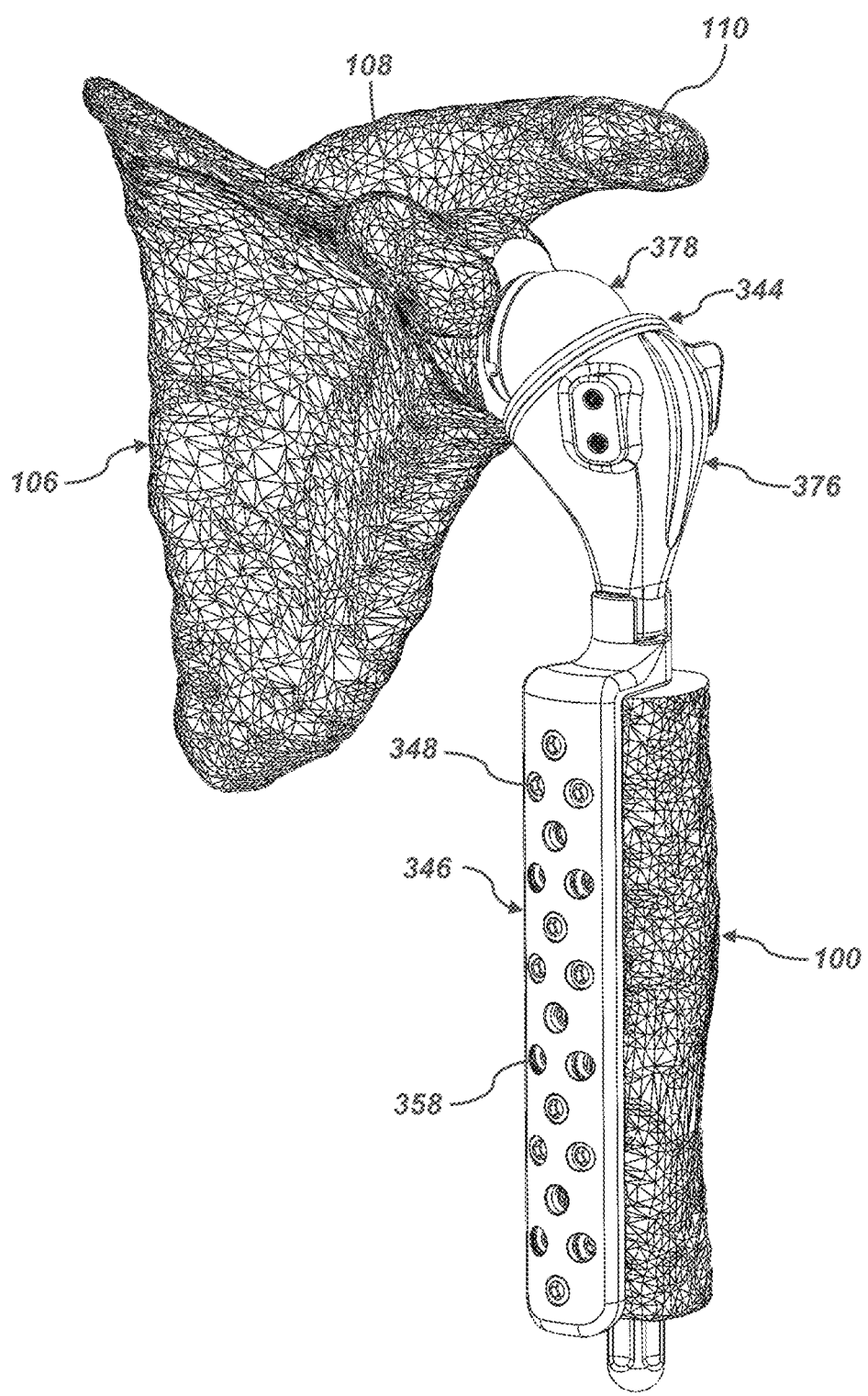
FIG. 16 is a perspective view of a shoulder joint illustrating a sixth embodiment of an orthopedic component, according to some embodiments.
Figure 17:
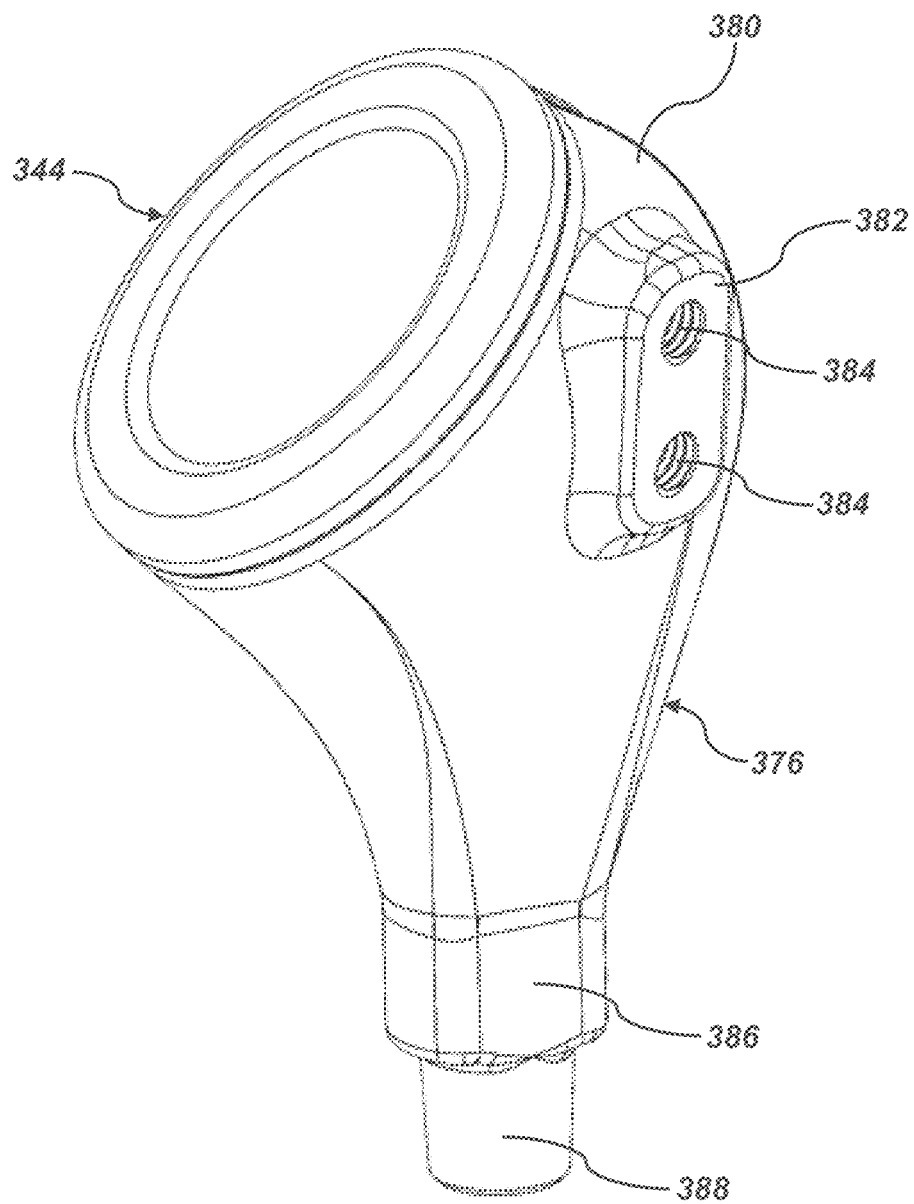
FIG. 17 is a side view of the embodiment shown in FIG. 16, according to some embodiments.

A sixth embodiment of an orthopedic component is illustrated in FIGS. 16-17. As shown therein, a shoulder joint that features a scapula 106 that includes the coracoid 108 and the acromion 110, and a portion of the humerus 100 representing severe proximal humeral bone loss. In the example depicted in FIG. 16, the orthopedic component includes a proximal humeral component 376, a cup component 344 that interfaces with a ball component 378, and a distal plate and stem component 346 with a plurality of fasteners 348. Preferably, the proximal humeral component, and the distal plate and stem component 346 are comprised of a biocompatible metal. The proximal humeral component 376 is adapted to cooperate with a glenoid component (not shown) that is adapted to be attached to scapula 106 using a plurality of fasteners (not shown). The glenoid component includes a ball portion 378 that is adapted to articulate with a socket of cup portion 344 as shown in FIG. 16. The socket may include a cup liner.

FIG. 17 shows a detailed view of the fifth embodiment of the orthopedic component. In the embodiment depicted in FIG. 17, the proximal humeral component 376 has a cup component 344 that interfaces with a ball component (not shown), and has features 382 and 384 to attach various structures, including: devices that lock to feature 382 and 384 and can interface with bone fragments, tendons, ligaments, etc. using various attachment methods, including: sutures, cerclages, screws, etc. The proximal end 380 of the proximal humeral component 376 is shaped to allow muscles and tendons to follow a more anatomic shape, and to be tensioned as they would be in an intact humerus. In one embodiment, the distal portion 386 of the proximal humeral component 376 is shaped to provide rotational stability when connected to the distal plate and stem component 346.

Figure 18:
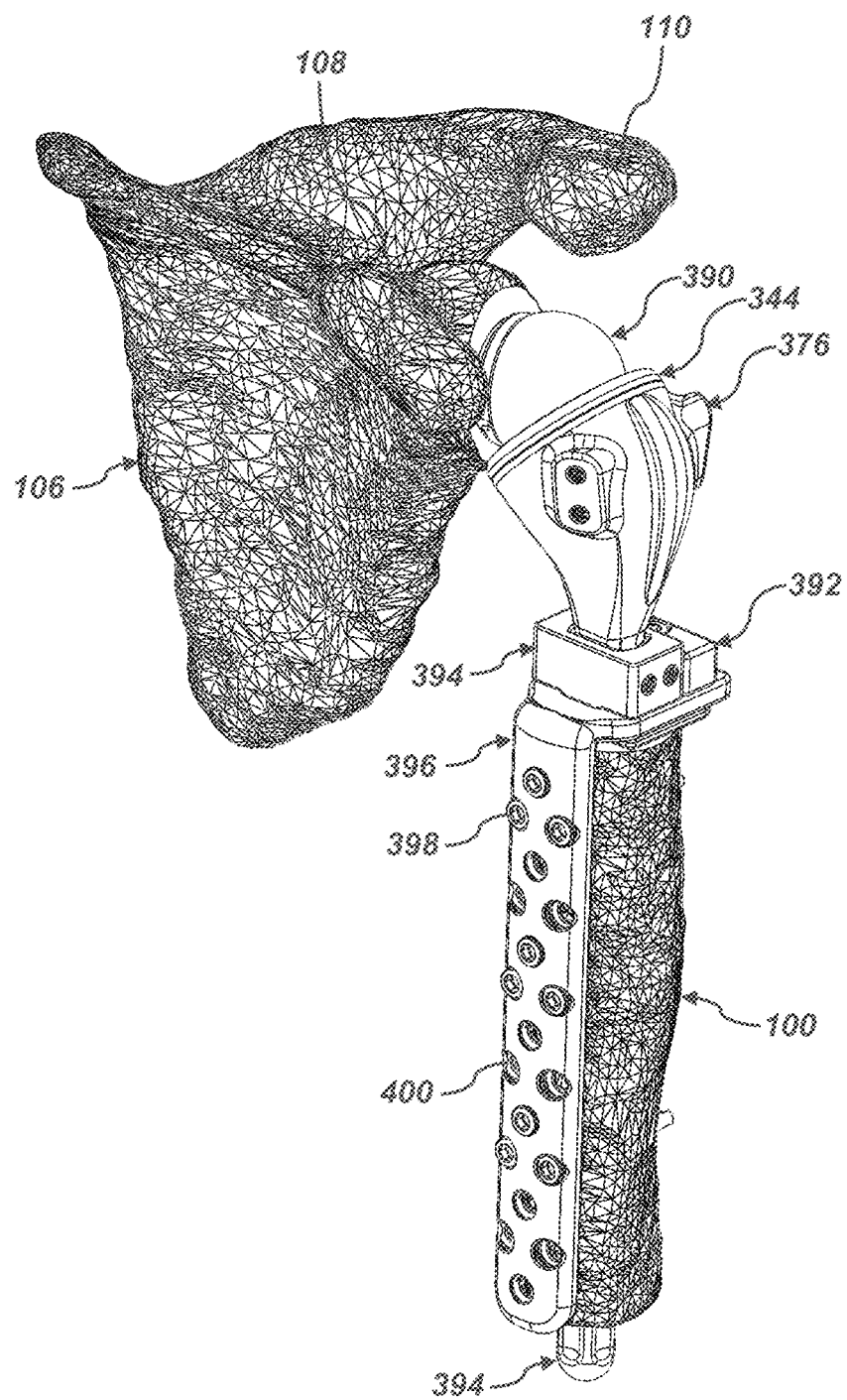
FIG. 18 is a perspective view of a shoulder joint illustrating a seventh embodiment of an orthopedic component, according to some embodiments.
Figure 19:
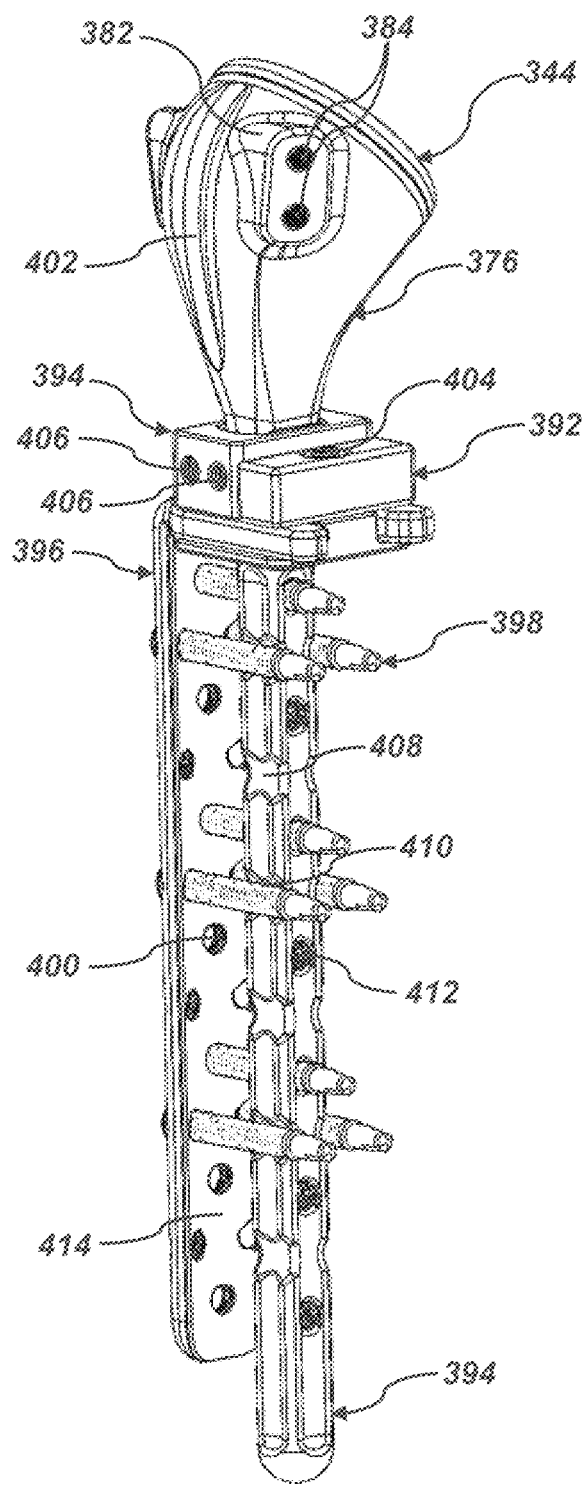
FIG. 19 is a perspective view of the embodiment shown in FIG. 18, according to some embodiments.
Figure 20:
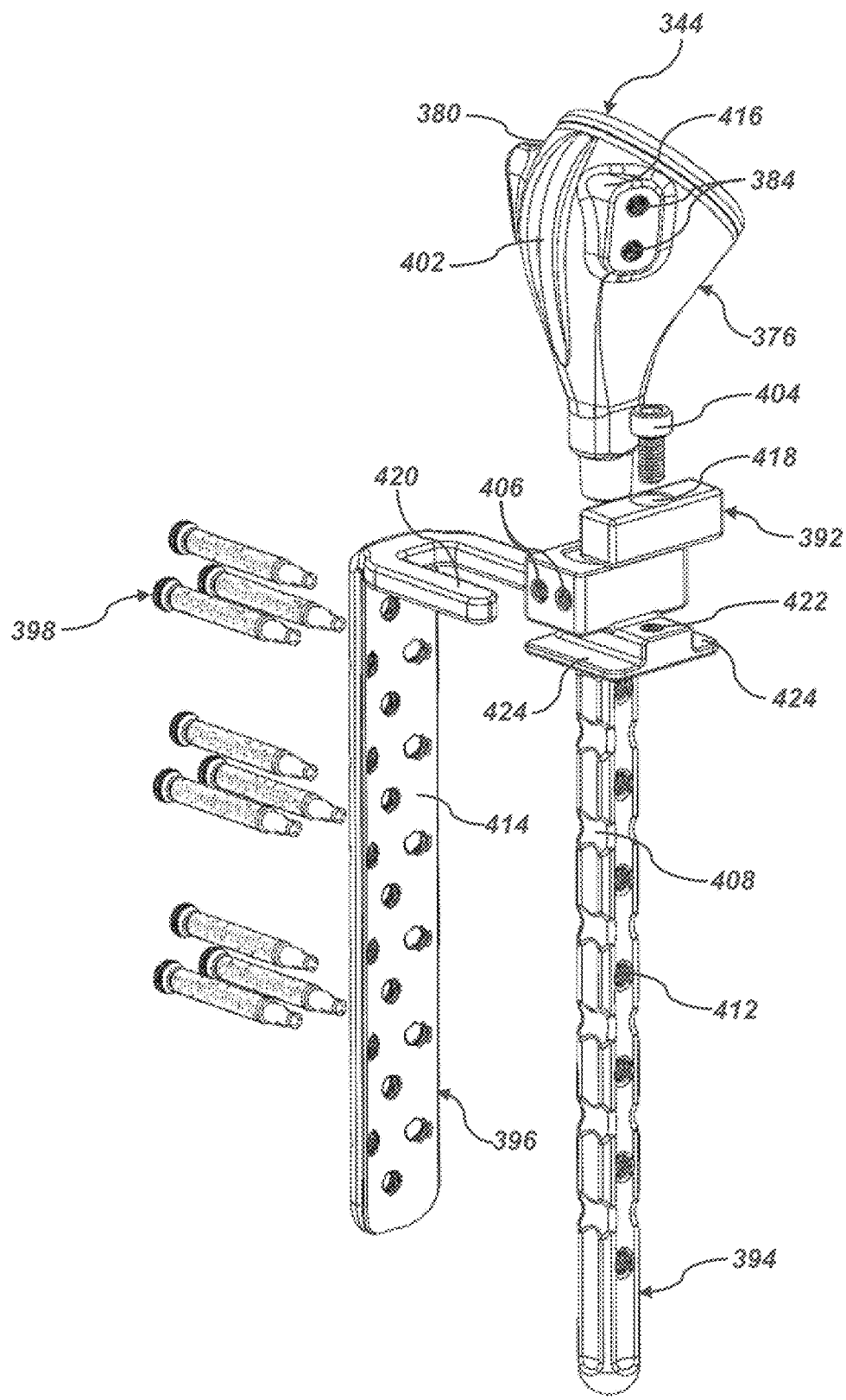
FIG. 20 is an exploded view of the embodiment shown in FIG. 18, according to some embodiments.

A seventh embodiment of an orthopedic component is illustrated in FIGS. 18-20. As shown therein, a shoulder joint that features a scapula 106 that includes the coracoid 108 and the acromion 110, and a portion of the humerus 100 representing severe proximal humeral bone loss. The orthopedic component depicted in FIG. 18 includes a proximal humeral component 376, a cup component 344 that interfaces with a ball component 390, and a distal plate component 396 with a plurality of fasteners 398 that interface with a plurality of holes 400, a stem component 394, and a locking component 392. In some embodiments, the distal plate component is located on a side of the cup component 344. Preferably, the proximal humeral component, the distal plate component, the stem component and the locking component are comprised of titanium or another biocompatible metal. The proximal humeral component 376 is adapted to cooperate with a glenoid component (not shown) that is adapted to be attached to scapula 106 using a plurality of fasteners (not shown). The glenoid component includes a ball portion 390 that is adapted to articulate with a socket of cup portion 344 as shown in FIG. 18. In some embodiments, the socket can include a cup liner.

FIG. 19 shows a detailed view of the seventh embodiment of the orthopedic component. The proximal humeral component 376 has a cup component 344 that interfaces with a ball component (not shown), and has features 382, 384 and 406 to attach various structures, including: devices that lock to features 382, 384 and 406 and can interface with bone fragments, tendons, ligaments, etc. using various attachment methods, including: sutures, cerclages, screws, etc. The distal plate component 396 and distal stem component 394 consists of an inner plate portion 414 with a plurality of holes 400 that can be threaded or smooth to accept a plurality of fasteners 398 that can be locking or non-locking, respectively, and whereas the stem portion 394 has holes 412 that can be threaded or smooth to accept a plurality of fasteners 398 that can be locking on non-locking, respectively, and concave features 408 that allow the fasteners 398 to be placed along the outer edges of the stem portion 394. The distal plate component 396 can be locked to distal stem component 394 with locking component 392 that is fastened with fastener 404.

FIG. 20 shows a detailed exploded view of the seventh embodiment of the orthopedic component. The proximal humeral component 376 has a cup component 344 that interfaces with a ball component (not shown), and has features 384 and 406 to attach various structures, including: bone fragments, tendons, ligaments, etc. using various attachment methods, including: sutures, cerclages, screws, etc. In one embodiment, the proximal end 380 of the proximal humeral component 376 can be grooved 402 to allow muscles and tendons to follow a more anatomic shape, and to be tensioned as they would be in an intact humerus. The distal plate component 396 consists of an inner plate portion 414, and a forked feature 420 that interfaces with slotted feature 424 on the distal stem component 394. In one embodiment, the feature 420 of distal plate component 396 can be locked to make a unitary construct using a locking component 392 with a fastener 404. In such embodiments, the distal stem component 394 includes holes 412 to allow the use of locked and/or non-locked fasteners 398 has Additionally, in some embodiments, the distal stem component 394 includes concave features 408 that allow the fasteners 398 to be placed along the outer edges of the distal stem component 394.

Figure 21:
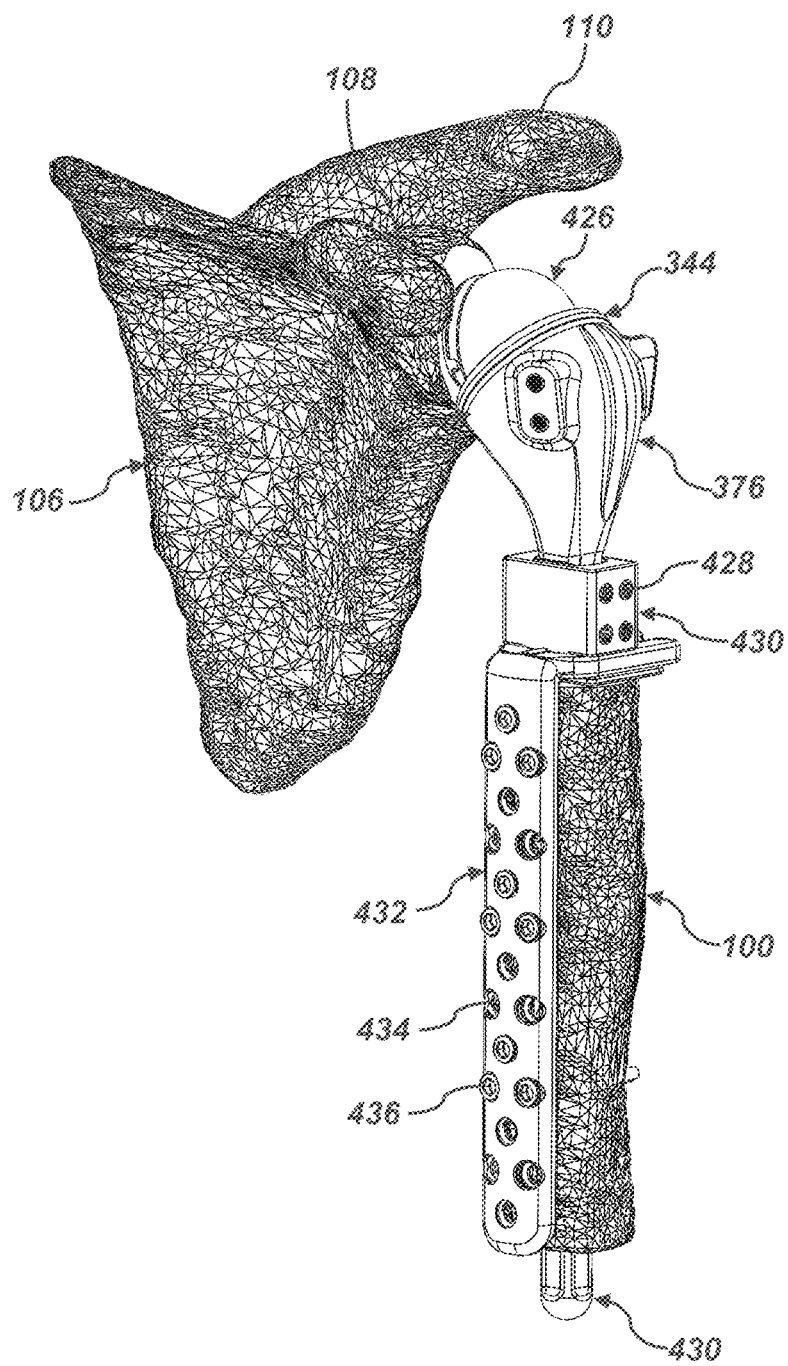
FIG. 21 is a perspective view of a shoulder joint illustrating an eighth embodiment of an orthopedic component, according to some embodiments.
Figure 22:
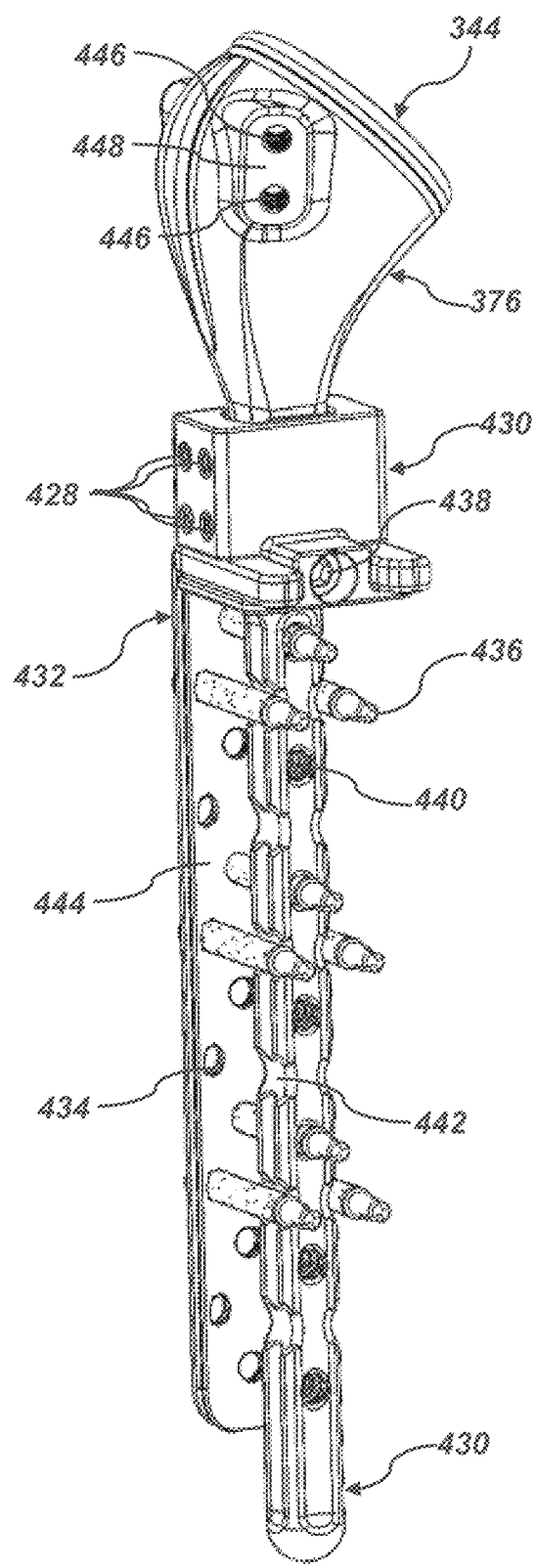
FIG. 22 is a perspective view of the embodiment shown in FIG. 21, according to some embodiments.
Figure 23:
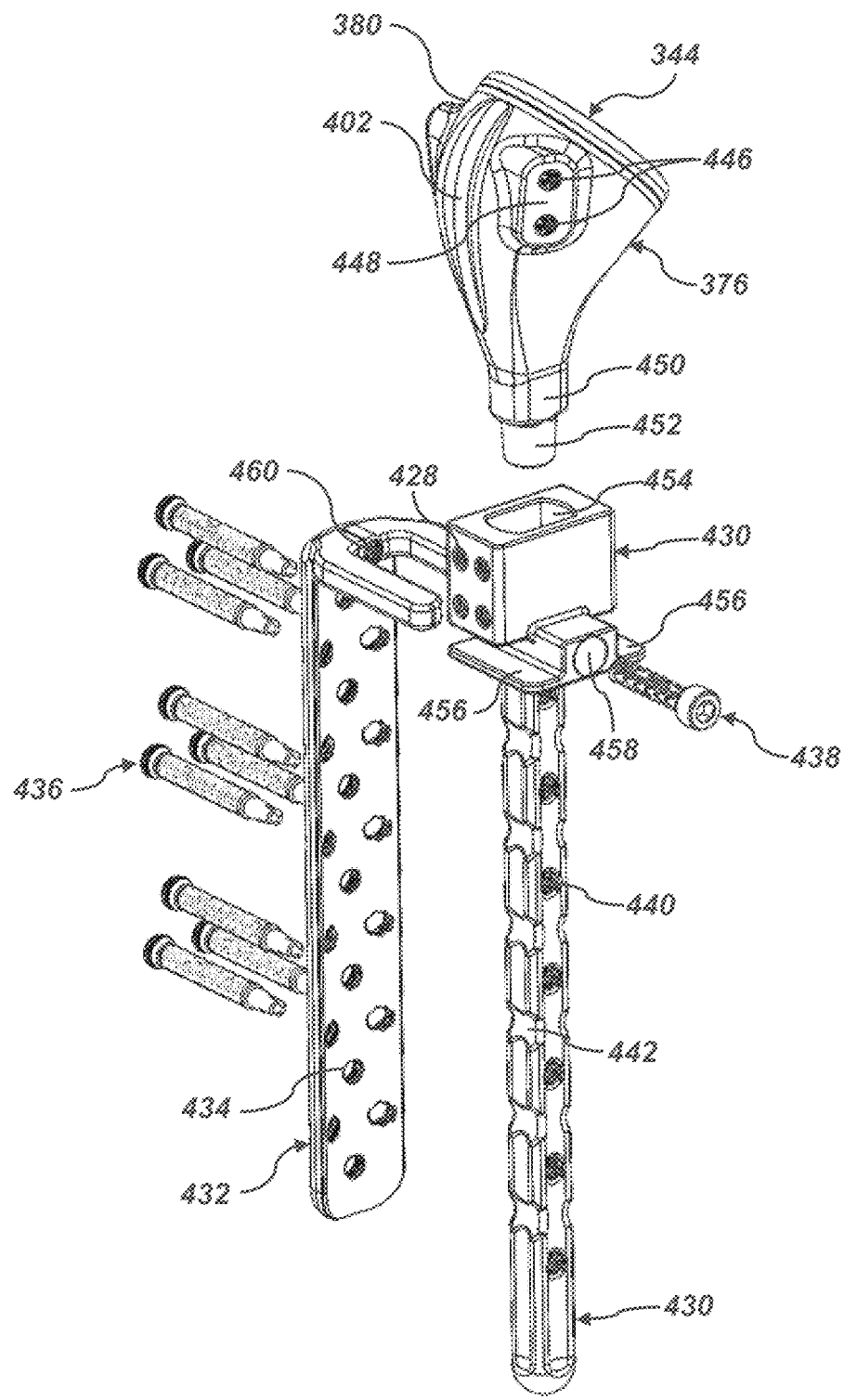
FIG. 23 is an exploded view of the embodiment shown in FIG. 21, according to some embodiments.

An eighth embodiment of an orthopedic component is illustrated in FIGS. 21-23. As shown therein, a shoulder joint that features a scapula 106 that includes the coracoid 108 and the acromion 110, and a portion of the humerus 100 representing severe proximal humeral bone loss. The orthopedic component depicted in FIGS. 21-23 includes a proximal humeral component 376, a cup component 344 that interfaces with a ball component 426, and a distal plate component 432 with a plurality of fasteners 436 that interface with a plurality of holes 434, and a stem component 430. In one embodiment, the proximal humeral component, the distal plate component, and the stem component are comprised of biocompatible metal. The proximal humeral component 376 is adapted to cooperate with a glenoid component (not shown) that is adapted to be attached to scapula 106 using a plurality of fasteners (not shown). The glenoid component includes a ball portion 426 that is adapted to articulate with a socket of cup portion 344 as shown in FIG. 21. The socket may include a cup liner.

FIG. 22 shows a detailed view of the eighth embodiment of the orthopedic component. The proximal humeral component 376 has a cup component 344 that interfaces with a ball component (not shown), and has features 428, 446 and 448 to attach various structures, including: devices that lock to features 428, 446 and 448 and can interface with bone fragments, tendons, ligaments, etc. using various attachment methods, including: sutures, cerclages, screws, etc. In one form, the distal plate component 432 and distal stem component 430 comprises an inner plate portion 444 with a plurality of holes 434 that can be threaded or smooth to accept a plurality of fasteners 436. The fasteners 436 can be locking or non-locking, respectively. Additionally, in some embodiments, the stem portion 430 includes holes 440 that can be threaded or smooth to accept a plurality of fasteners 436 that can be locking on non-locking, respectively. Further, in such embodiments, the stem portion 430 can include concave features 442 that allow the fasteners 436 to be placed along the outer edges of the stem portion 430. The distal plate component 432 can be locked to distal stem component 430 with fastener 438. In some embodiments, the fastener 438 acts as an adjustment. For example, the fastener 438 can interact with a threaded aperture 460 of the distal plate component 432 to draw the distal plate component toward, and away from, the proximal humeral component 376 thus adjusting a gap between the distal plate component 432 and the proximal humeral component 376.

FIG. 23 shows a detailed exploded view of the eighth embodiment of the orthopedic component. The proximal humeral component 376 has a cup component 344 that interfaces with a ball component (not shown), and has features 428, 446 and 448 to attach various structures, including: bone fragments, tendons, ligaments, etc. using various attachment methods, including: sutures, cerclages, screws, etc. The distal end 450 of the proximal humeral component 376 interfaces with proximal end 454 of the distal stem component 430 and is shaped to provide rotational stability. In some embodiments, the distal end 450 includes a tapered trunnion 452 to fasten the proximal humeral component 376 with the proximal stem component 430. The proximal end 380 of the proximal humeral component 376 can be grooved 402 to allow muscles and tendons to follow a more anatomic shape, and to be tensioned as they would be in an intact humerus. The feature 460 of the distal plate component 432 can be locked to make a unitary construct using the feature 458 with the fastener 438. In one embodiment, the distal stem component 430 includes holes 440 to allow the use of locked and/or non-locked fasteners 436. Additionally, in some embodiments, the distal stem component 430 includes concave features 442 that allow the fasteners 436 to be placed along the outer edges of the stem portion 430.

Figure 24:
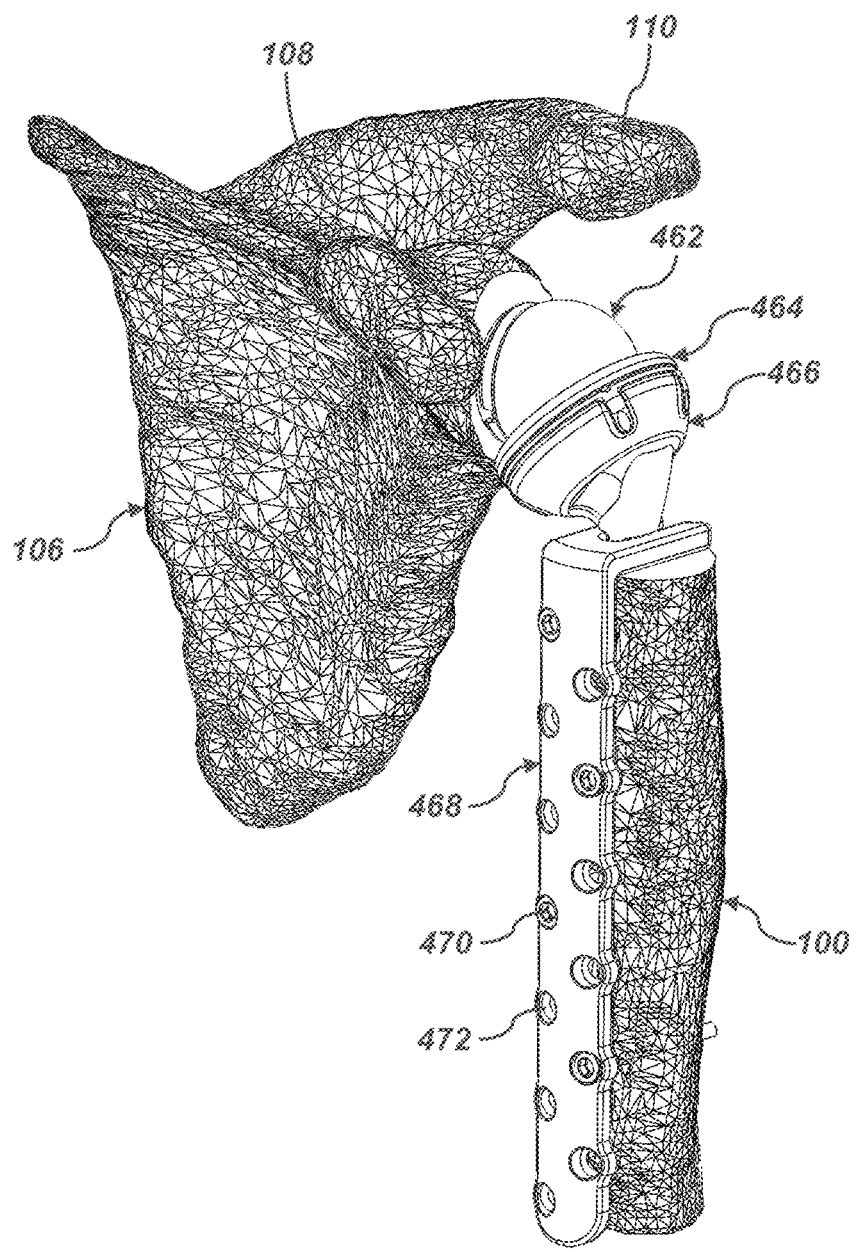
FIG. 24 is a perspective view of a shoulder joint illustrating a ninth embodiment of an orthopedic component, according to some embodiments.
Figure 25:
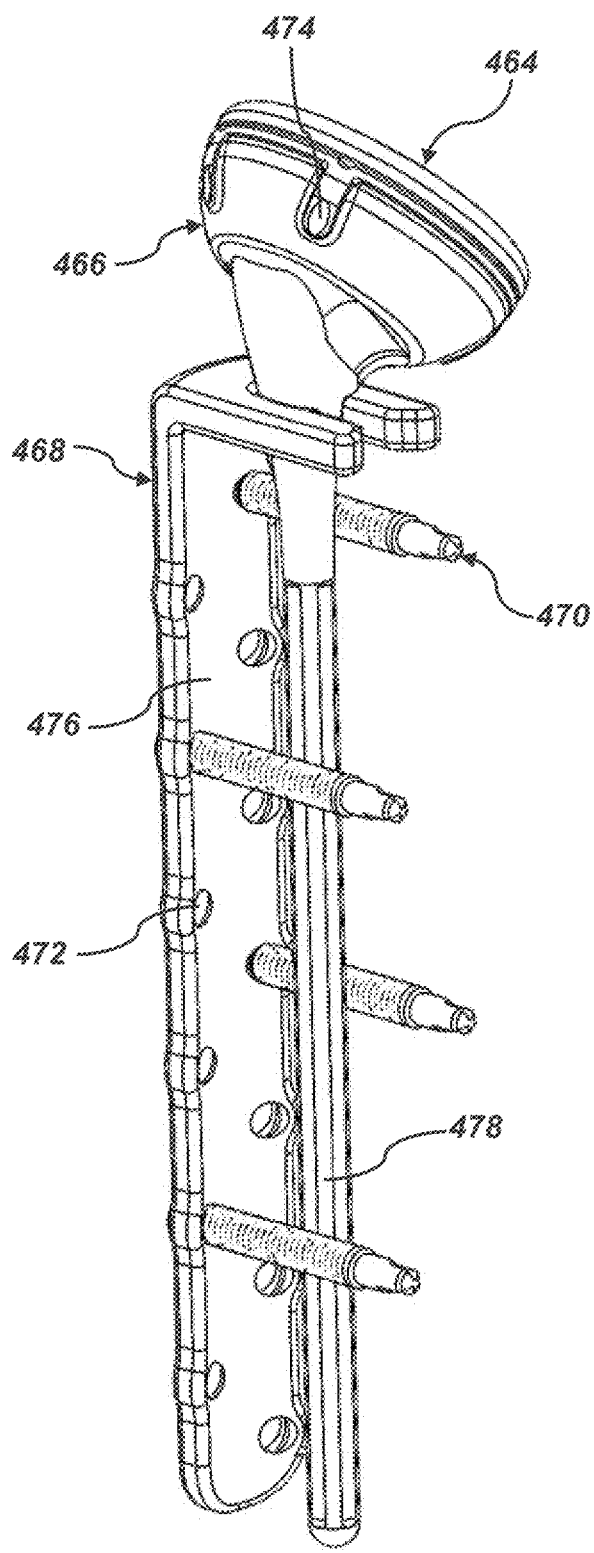
FIG. 25 is a perspective view of the embodiment shown in FIG. 24, according to some embodiments.
Figure 26:
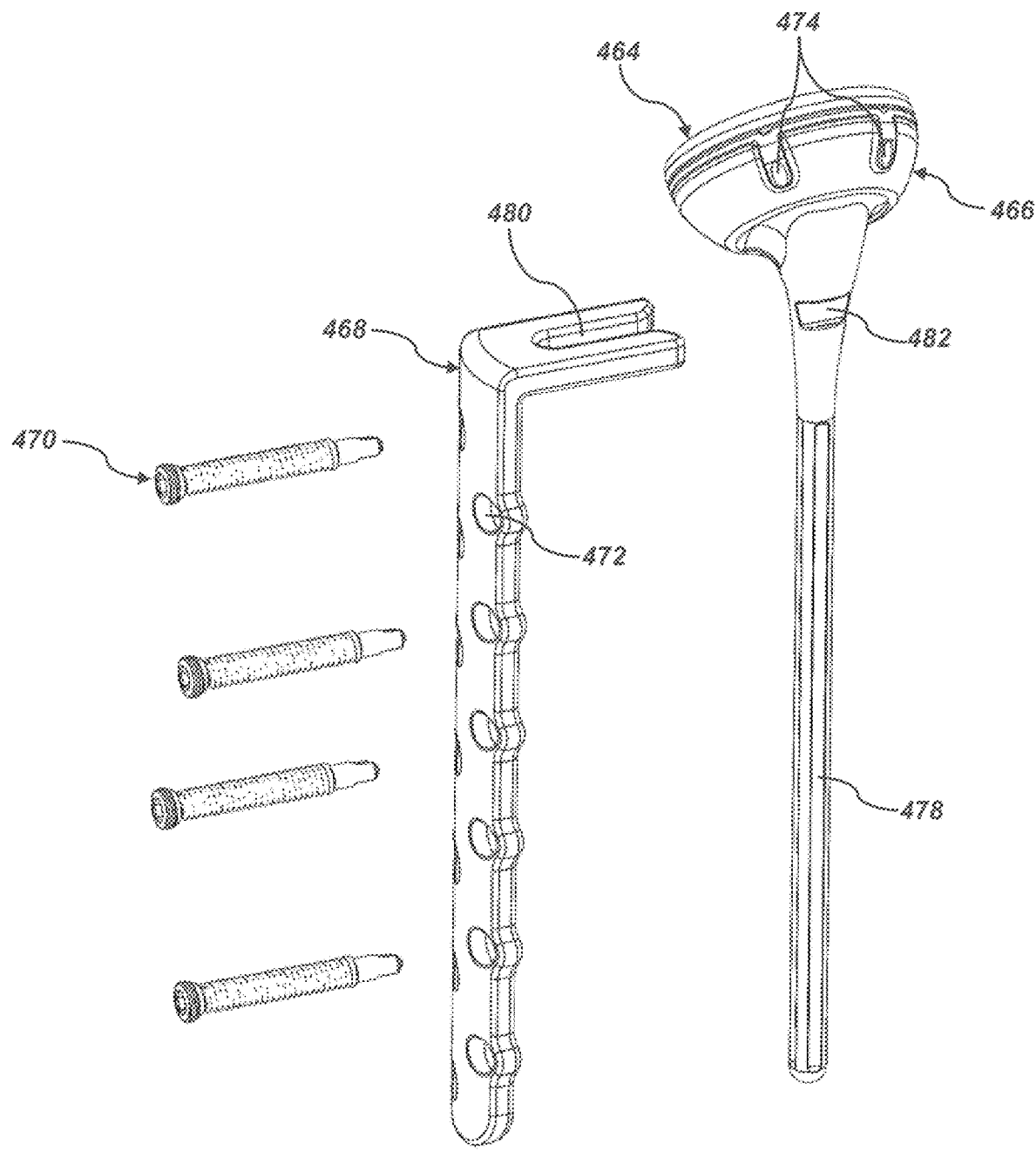
FIG. 26 is an exploded view of the embodiment shown in FIG. 24, according to some embodiments.

A ninth embodiment of an orthopedic component is illustrated in FIGS. 24-26. As shown therein, a shoulder joint that features a scapula 106 that includes the coracoid 108 and the acromion 110, and a portion of the humerus 100 representing severe proximal humeral bone loss. The orthopedic component depicted in FIGS. 24-26 includes a proximal humeral component 466, a cup component 464 that interfaces with a ball component 462, and a distal plate component 468 with a plurality of fasteners 470 that interface with a plurality of holes 470. Preferably, the proximal humeral component and the distal plate component are comprised of biocompatible metal. The proximal humeral component 466 is adapted to cooperate with a glenoid component (not shown) that is adapted to be attached to scapula 106 using a plurality of fasteners (not shown). The glenoid component includes a ball portion 462 that is adapted to articulate with a socket of cup portion 464 as shown in FIG. 24. The socket may include a cup liner.

FIG. 25 shows a detailed view of the ninth embodiment of the orthopedic component. The proximal humeral component 466 has a cup component 464 that interfaces with a ball component (not shown), and has features 474 to attach various structures, including: bone fragments, tendons, ligaments, etc. using various attachment methods, including: sutures, cerclages, etc. In one embodiment, the distal plate component 468 and distal stem component 466 consist of an inner plate portion 476 with a plurality of holes 472 that can be threaded or smooth to accept a plurality of fasteners 470 that can be locking or non-locking, respectively.

FIG. 26 shows a detailed exploded view of a ninth embodiment of an orthopedic component. The orthopedic component depicted in FIG. 26 is a proximal humeral component 466. In one embodiment, the proximal humeral component 466 includes a cup component 464 that interfaces with a ball component (not shown). Additionally, the proximal humeral component 466 can include features 474 to attach various structures, including: bone fragments, tendons, ligaments, etc. using various attachment methods, including: sutures, cerclages, etc. The proximal plate component 468 can include holes 472 to allow the use of locked and/or non-locked fasteners 470. Additionally, in some embodiments, the proximal plate component 468 can include a slotted feature 480 that interfaces with the proximal stem component 466 in area 482 and provides rotational stability.

Figure 27:
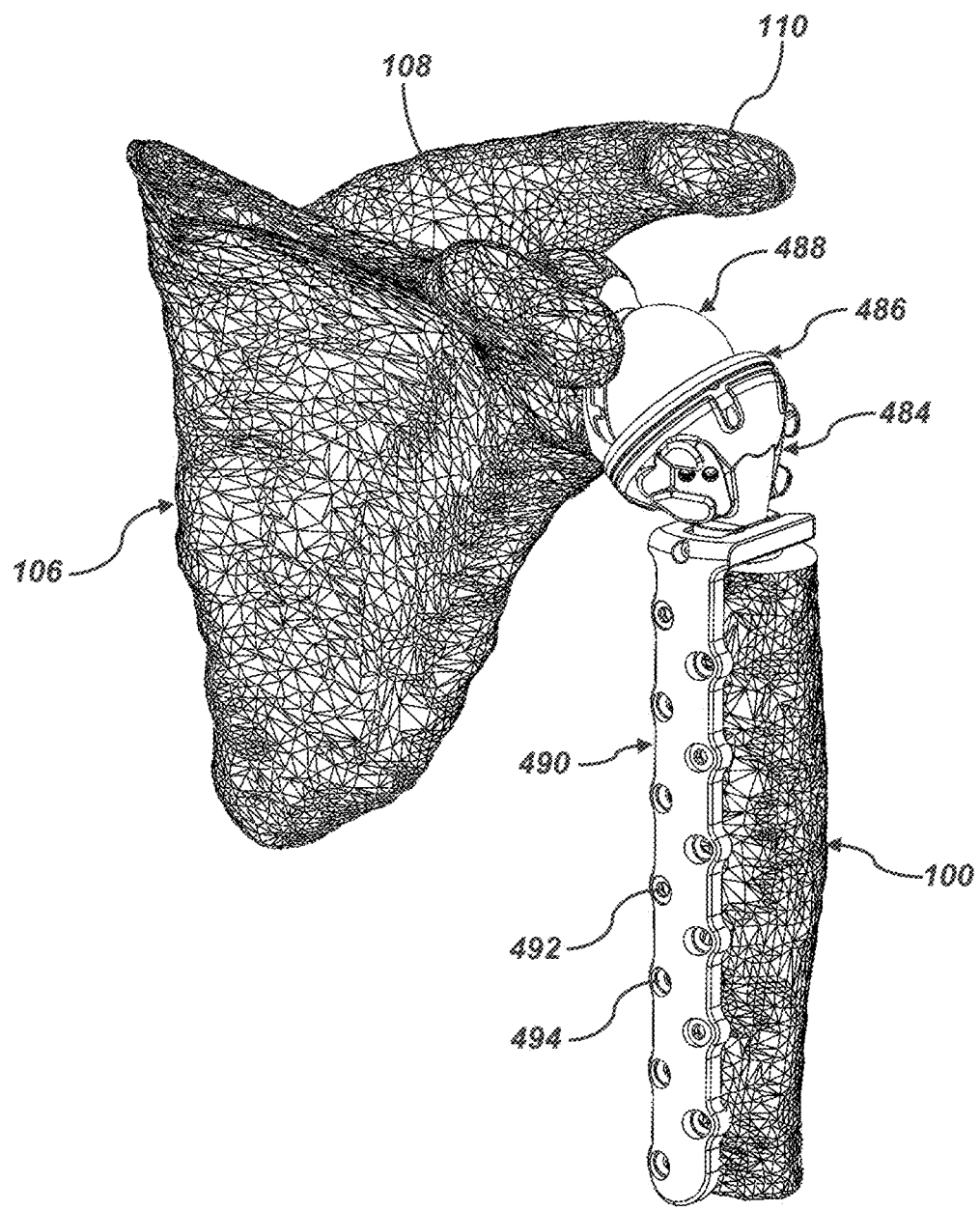
FIG. 27 is a perspective view of a shoulder joint illustrating a tenth embodiment of an orthopedic component, according to some embodiments.
Figure 28:
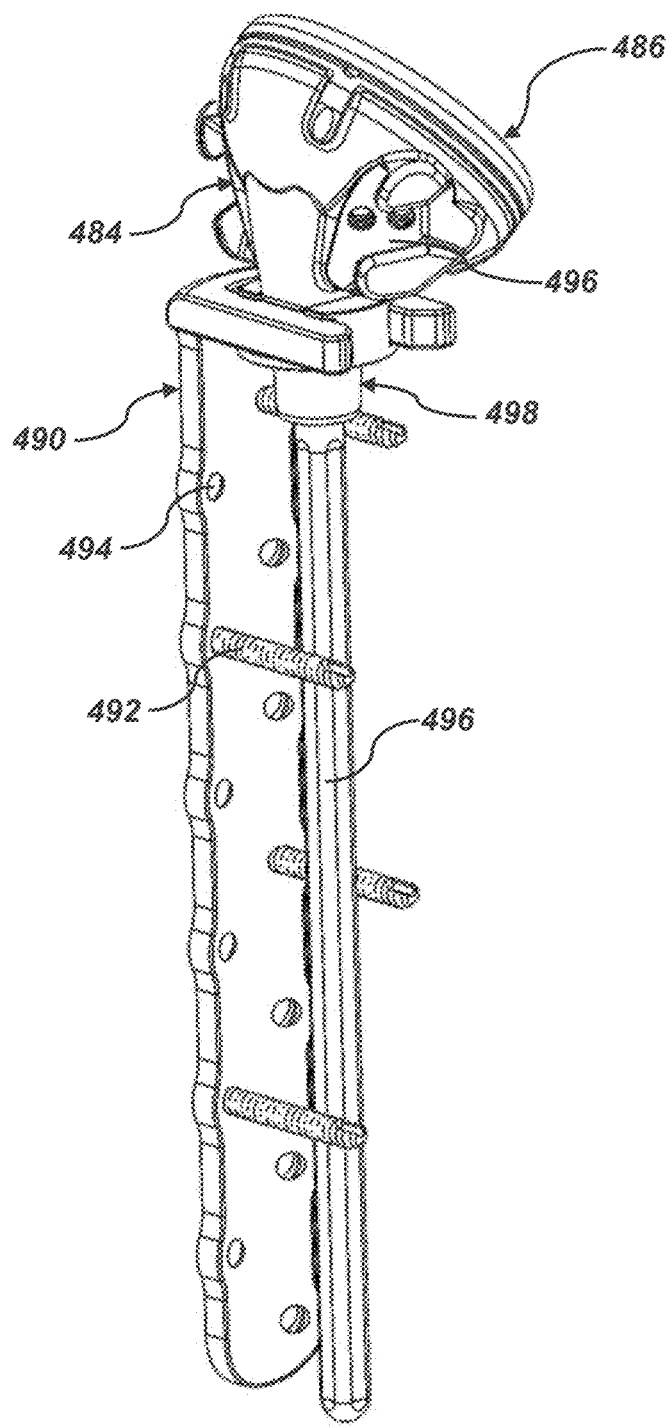
FIG. 28 is a perspective view of the embodiment shown in FIG. 27, according to some embodiments.
Figure 29:
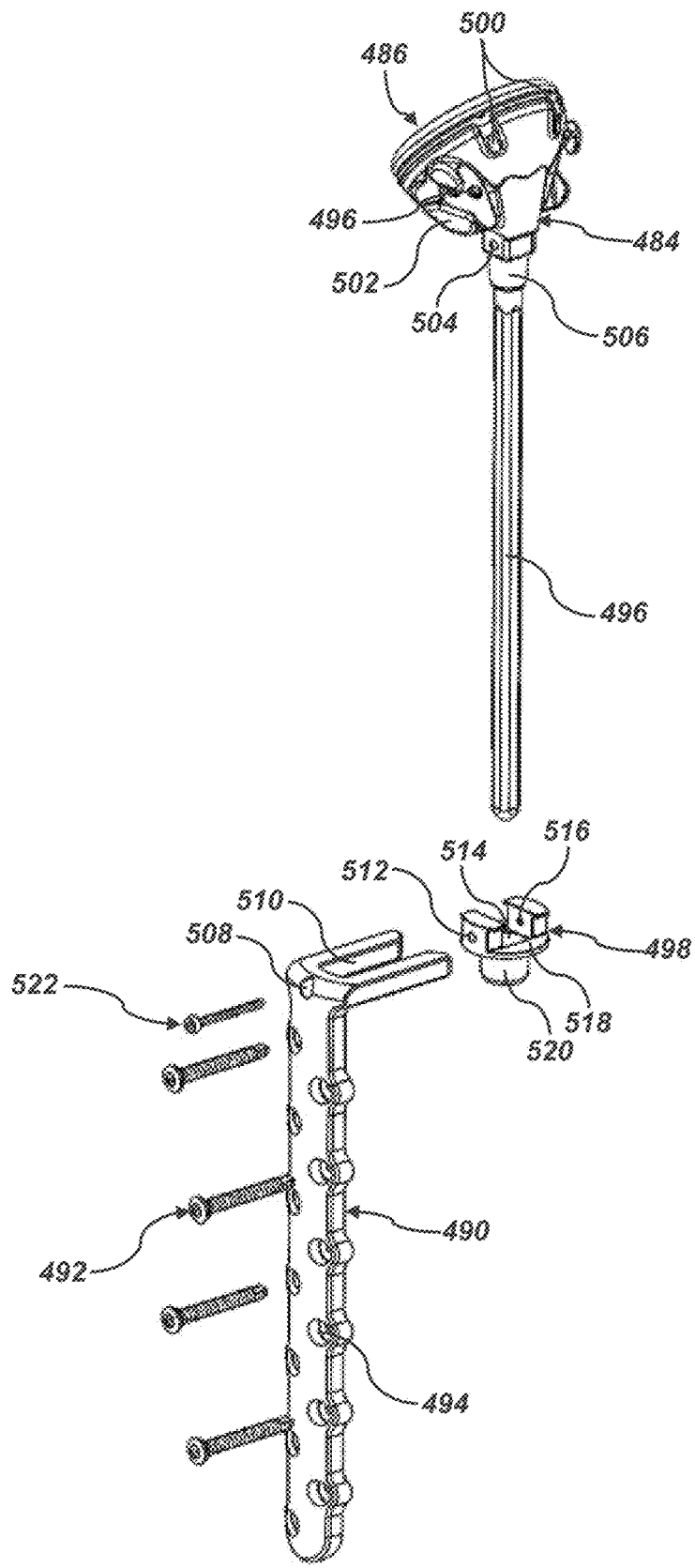
FIG. 29 is an exploded view of the embodiment shown in FIG. 27, according to some embodiments.

A tenth embodiment of an orthopedic component is illustrated in FIGS. 27-29. As shown therein, a shoulder joint that features a scapula 106 that includes the coracoid 108 and the acromion 110, and a portion of the humerus 100 representing severe proximal humeral bone loss. The orthopedic component depicted in FIGS. 27-29 includes a proximal humeral component 484, a cup component 486 that interfaces with a ball component 488, and a distal plate component 490 with a plurality of fasteners 492 that interface with a plurality of holes 494. Preferably, the proximal humeral component and the distal plate component are comprised of biocompatible metal. The proximal humeral component 484 is adapted to cooperate with a glenoid component (not shown) that is adapted to be attached to scapula 106 using a plurality of fasteners (not shown). The glenoid component includes a ball portion 488 that is adapted to articulate with a socket of cup portion 486 as shown in FIG. 27. The socket may include a cup liner.

FIG. 28 shows a detailed view of the tenth embodiment of the orthopedic component. The proximal humeral component 484 has a cup component 486 that interfaces with a ball component (not shown), and has features 496 to attach various structures, including: devices that lock to features 496 and can interface with bone fragments, tendons, ligaments, etc. using various attachment methods, including: sutures, cerclages, screws, etc. The proximal humeral component 484 and distal plate component 490 attach to connector piece 498. The distal plate component 490 has of a plurality of holes 494 that can be threaded or smooth to accept a plurality of fasteners 492 that can be locking or non-locking, respectively.

FIG. 29 shows a detailed exploded view of the tenth embodiment of the orthopedic component. The proximal humeral component 484 has a cup component 486 that interfaces with a ball component (not shown), and has features 496 and 502 to attach various structures, including: bone fragments, tendons, ligaments, etc. using various attachment methods, including: sutures, cerclages, screws, etc. In the example depicted in FIG. 29, a tapered trunnion distal end 506 of the proximal humeral component 484 interfaces with the tapered socket 514 of the connector piece 498. The feature 510 slides on the feature 518 of the connector piece 498, and the distal plate component 490 can be locked to make a unitary construct by attaching distal plate component 490 and proximal humeral component 484 to connector piece 498 with fastener 522. Fastener 522 is introduced into hole 508 and continues through holes 512 and 504 and is threaded into hole 516. The distal stem component 430 has holes 440 to allow the use of locked and/or non-locked fasteners 436 and has concave features 442 that allow the fasteners 436 to be placed along the outer edges of the stem portion 430. Feature 520 of connector piece 498 attaches to the intramedullary canal of the humerus.

Figure 30:
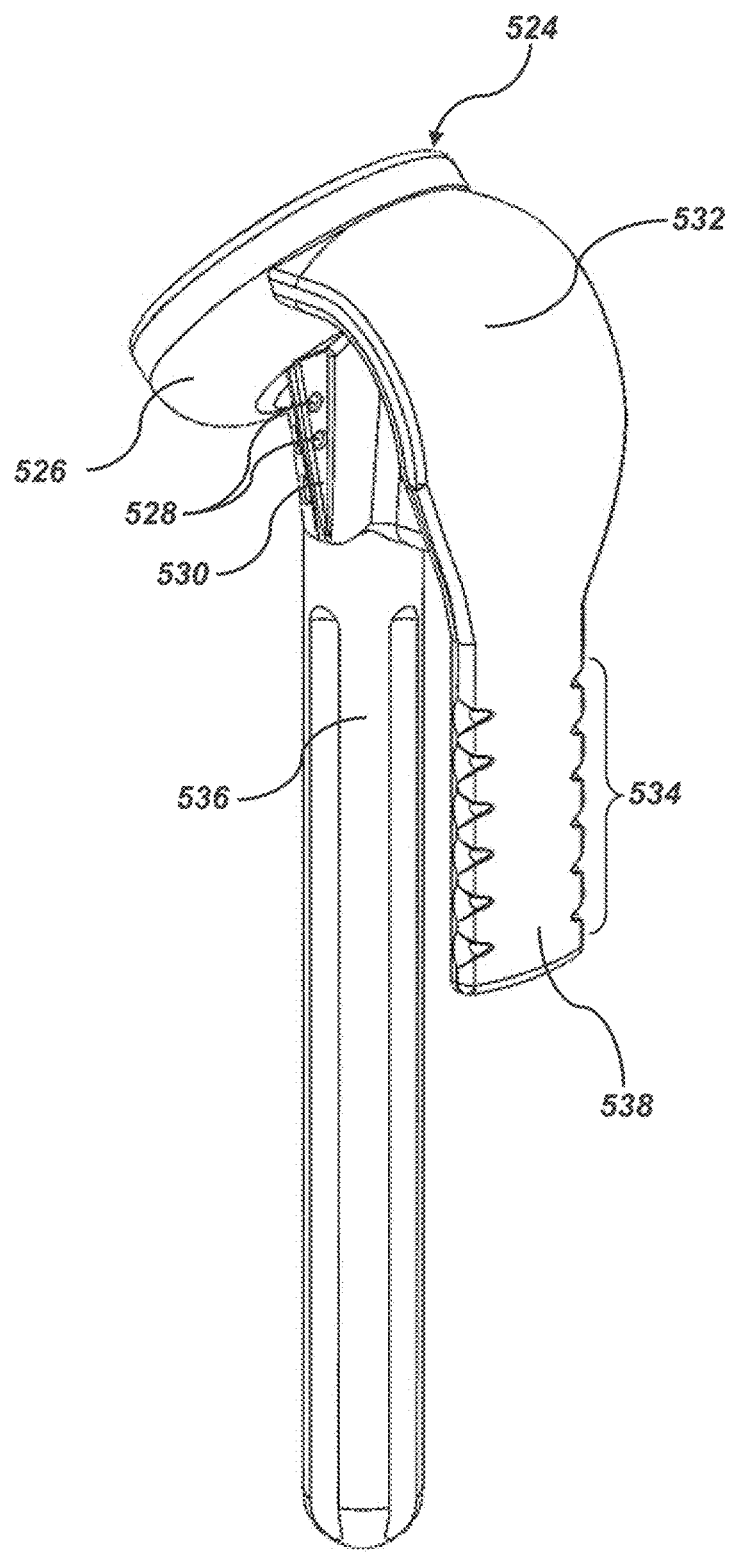
FIG. 30 is a perspective view of an eleventh embodiment of an orthopedic component, according to some embodiments.
Figure 31:
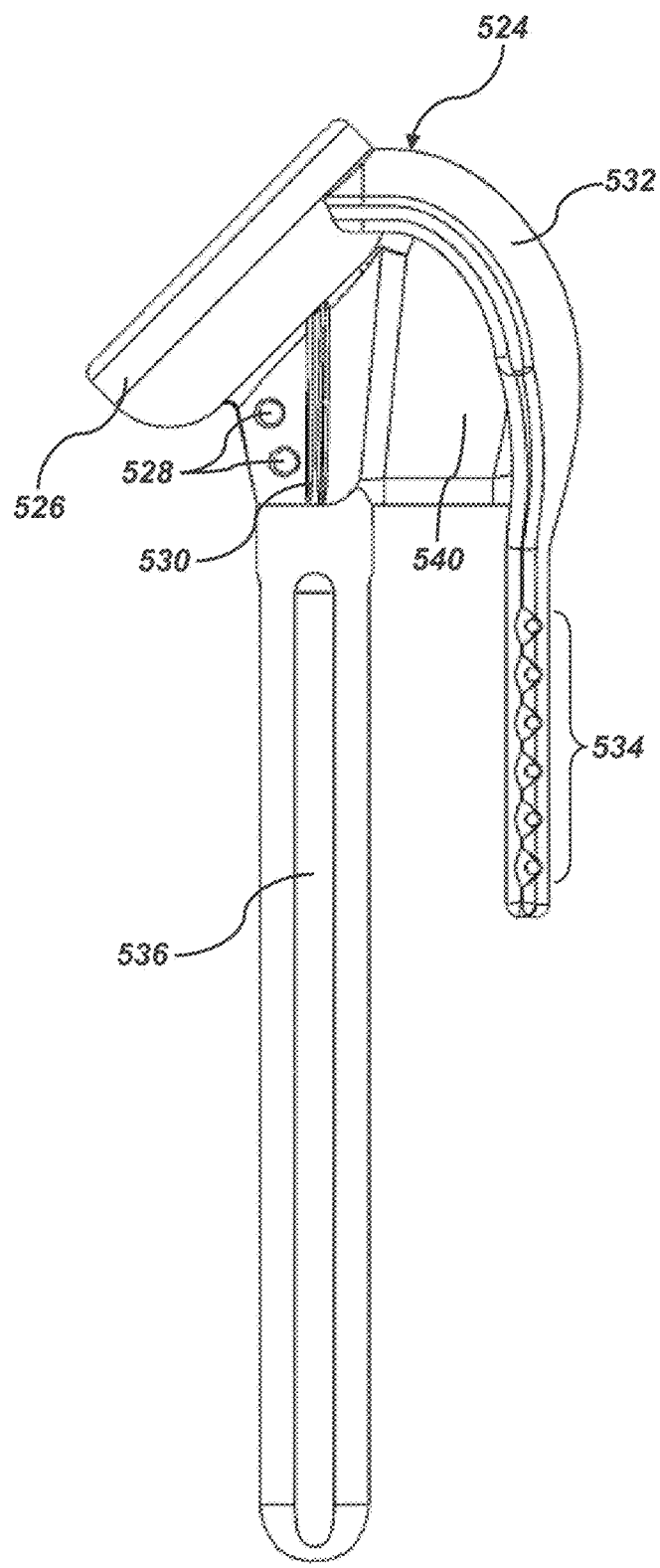
FIG. 31 is a side view of the embodiment shown in FIG. 30, according to some embodiments.

An eleventh embodiment of an orthopedic component is illustrated in FIGS. 30-31. As shown therein, the current embodiment consists of a humeral component 524 that has a cup portion 526 proximally with an attached curved plate 532 that allows the deltoid to follow along the implant. The curved plate 532 has a support structure 540 to provide stability. Preferably, the humeral component is comprised of biocompatible metal. The humeral component 524 has features 528 and 530 to attach various structures, including: bone fragments, tendons, ligaments, etc. using various attachment methods, including: sutures, cerclages, etc. In one embodiment, the stem 536 is placed in the intramedullary canal of the humerus with region 538 of curved plate 532 on the outside of the humerus. The features 534 are used to place various attachment methods, including: sutures, cerclages, etc. around the humerus to provide stability of the implant/humerus construct.

Figure 32:
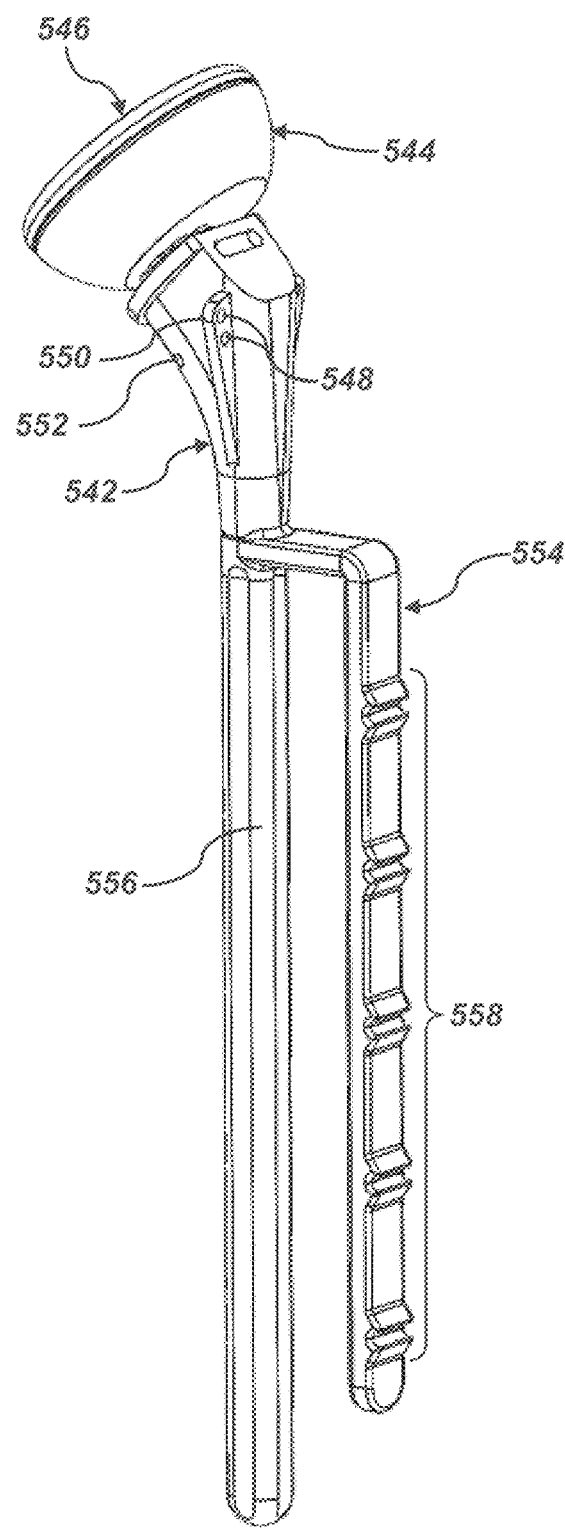
FIG. 32 is a perspective view of a twelfth embodiment of an orthopedic component, according to some embodiments.
Figure 33:
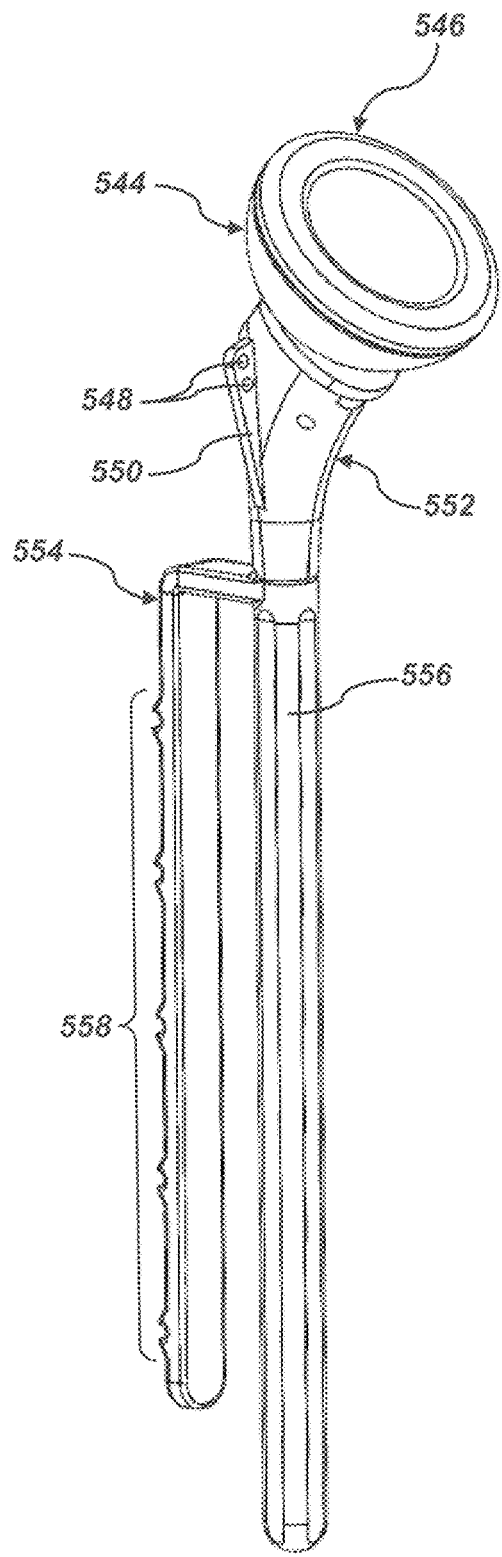
FIG. 33 is another perspective view of the embodiment shown in FIG. 32, according to some embodiments.

A twelfth embodiment of an orthopedic component is illustrated in FIGS. 32-33. As shown therein, the current embodiment consists of a humeral component 542, a cup component 544, and a socket component 546. The humeral component 542 has an attached angled plate 554. Preferably, the humeral component 542 is comprised of biocompatible metal. The humeral component 542 has features 548, 550 and 552 to attach various structures, including: bone fragments, tendons, ligaments, etc. using various attachment methods, including: sutures, cerclages, etc. The stem 556 can be placed in the intramedullary canal of the humerus with region 558 of angled plate 554 on the outside of the humerus. Raised features on 558 are used to place various attachment methods, including: sutures, cerclages, etc. around the humerus to provide stability of the implant/humerus construct.

Figure 34:
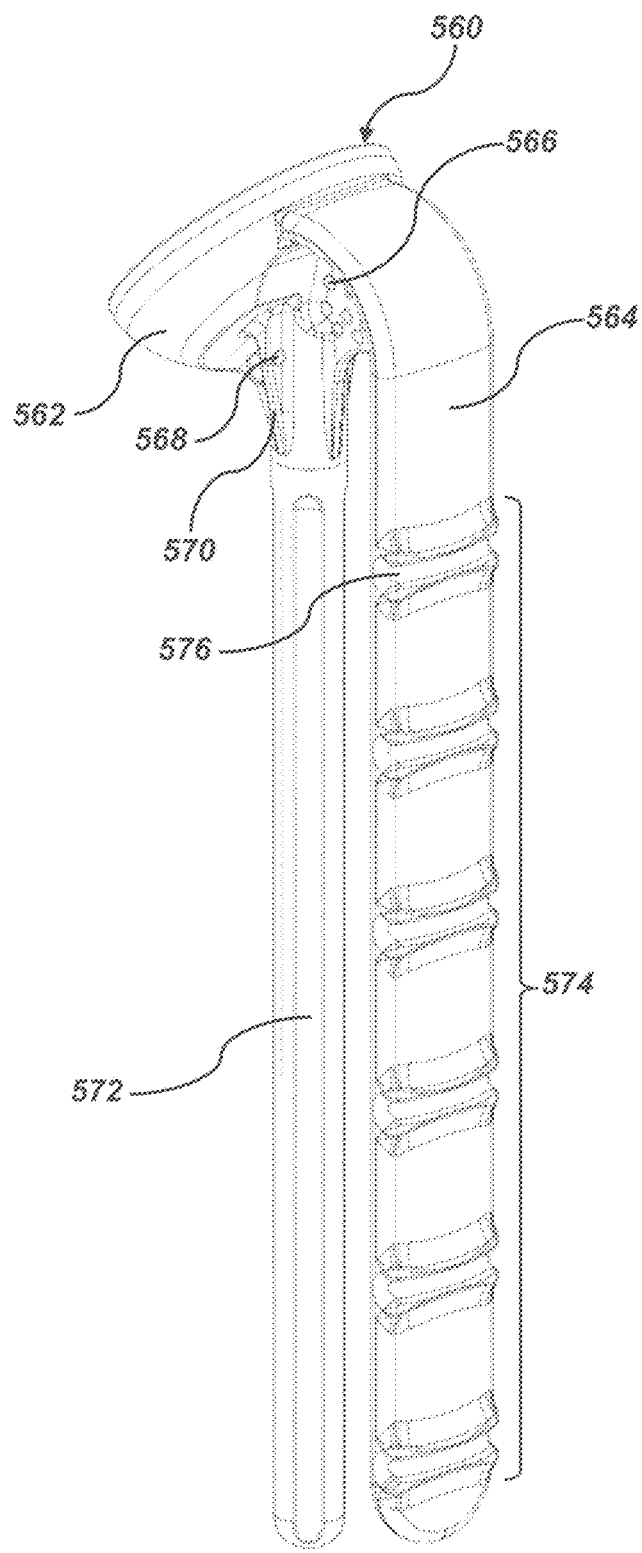
FIG. 34 is a perspective view of a thirteenth embodiment of an orthopedic component, according to some embodiments.
Figure 35:
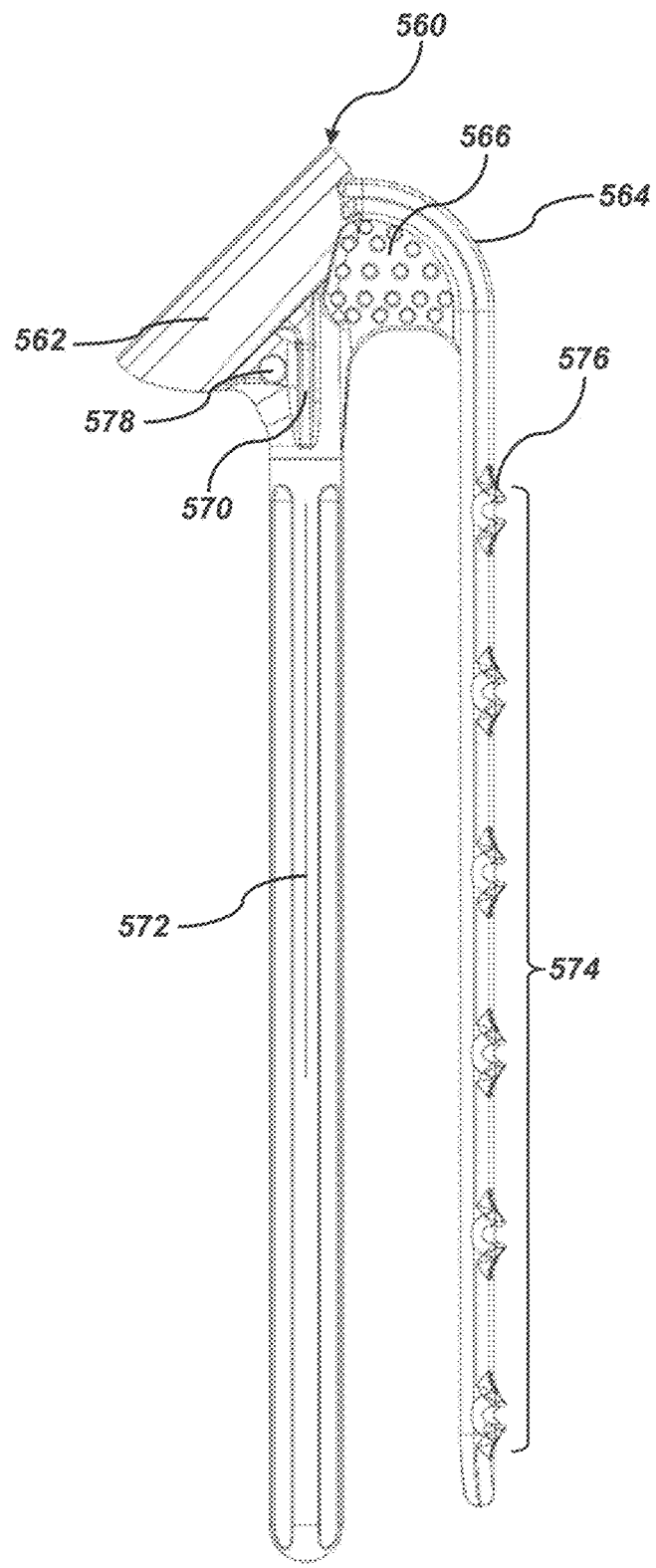
FIG. 35 is a side view of the embodiment shown in FIG. 34, according to some embodiments.

A thirteenth embodiment of an orthopedic component is illustrated in FIGS. 34-35. As shown therein, the current embodiment consists of a humeral component 560 that has a cup portion 562 proximally with an attached curved plate 564 that allows a muscle, such as the deltoid, to follow along the implant. The curved plate 564 has a support structure 566 to provide stability. Preferably, the humeral component is comprised of biocompatible metal. The humeral component 560 has features 568, 570 and 578 to attach various structures, including: bone fragments, tendons, ligaments, etc. using various attachment methods, including: sutures, cerclages, etc. The stem 572 can be placed in the intramedullary canal of the humerus with region 574 of curved plate 564 on the outside of the humerus. Features 574 and 576 are used to place various attachment methods, including: sutures, cerclages, etc. around the humerus to provide stability of the implant/humerus construct.

Figure 36:
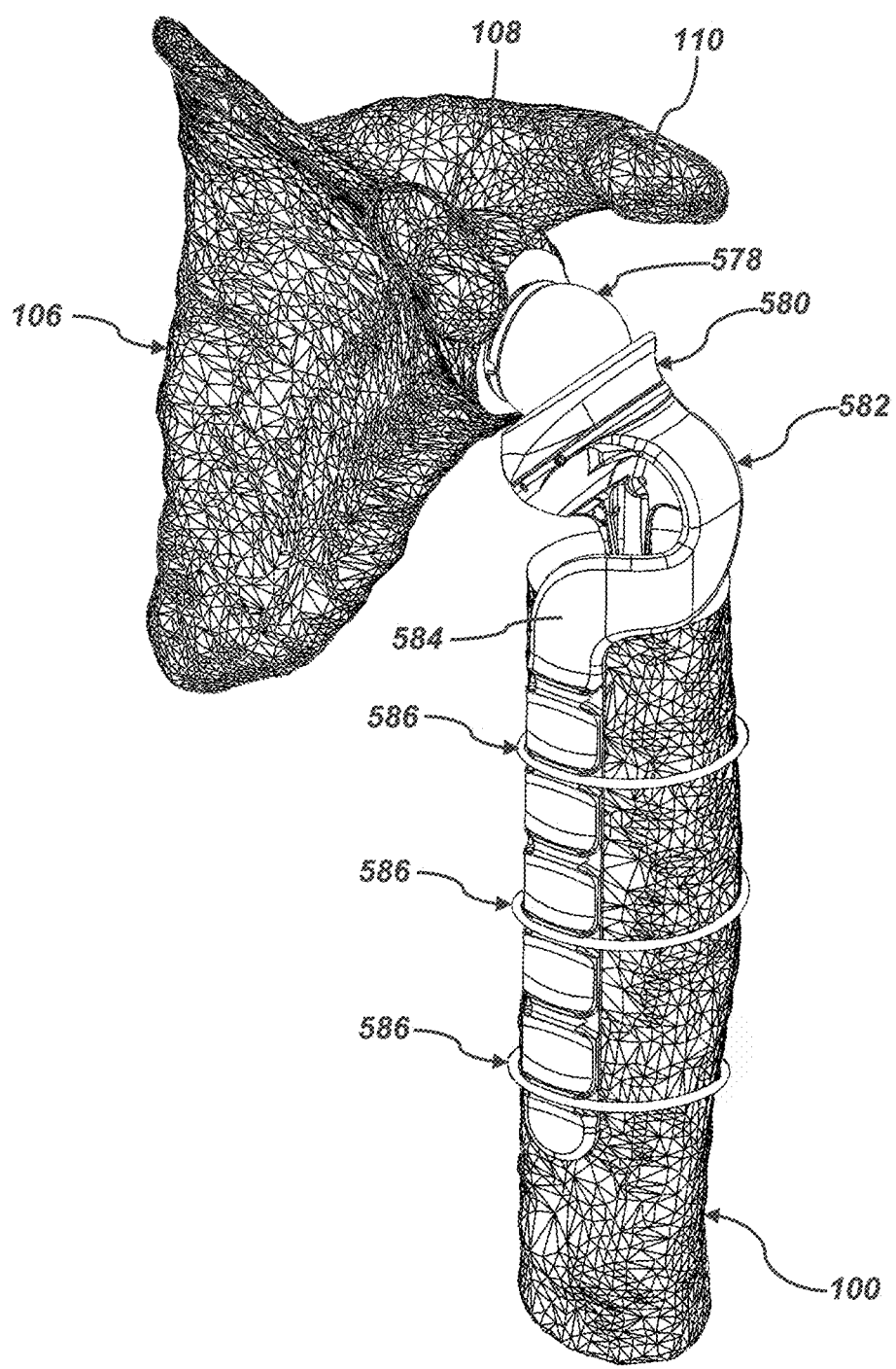
FIG. 36 is a perspective view of a shoulder joint illustrating a fourteenth embodiment of an orthopedic component, according to some embodiments.
Figure 37:
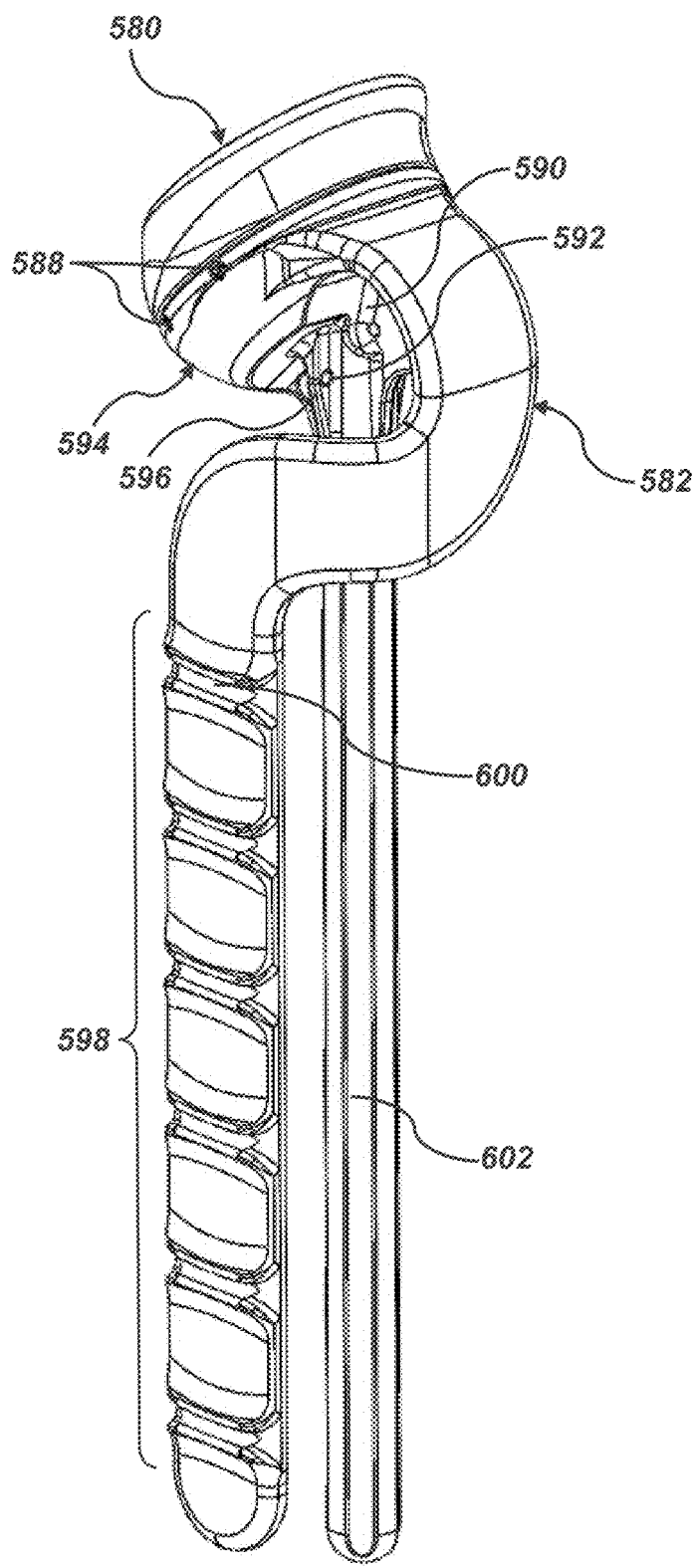
FIG. 37 is a perspective view of the embodiment shown in FIG. 36, according to some embodiments.

A fourteenth embodiment of an orthopedic component is illustrated in FIGS. 36-37. As shown therein, a shoulder joint that features a scapula 106 that includes the coracoid 108 and the acromion 110, and a portion of the humerus 100 representing severe proximal humeral bone loss. The current embodiment consists of a humeral component 594 that has a socket portion 580 proximally with an attached curved plate 582 that allows the deltoid to follow along the implant and is preferentially angled anteriorly 584 to allow the curved plate to be attached to the humerus. In one embodiment, the curved plate 582 has a support structure 590 to provide stability. Preferably, the humeral component is comprised of biocompatible metal. The humeral component 594 has features 596 and 592 to attach various structures, including: bone fragments, tendons, ligaments, etc. using various attachment methods, including: sutures, cerclages, etc. The stem 602 can be placed in the intramedullary canal of the humerus with region 598 of curved plate 584 attached on the outside of the humerus with cerclages 586. The features 600 can be used to place various attachment methods 586, including: sutures, cerclages, etc. around the humerus to provide stability of the implant/humerus construct.

The principles, preferred embodiments and modes of operation of the present invention have been made apparent in the foregoing description.

Although the embodiments are numbered with, for example, "first," "second," "third," or "fourth," the ordinal numbers do not imply priorities of the embodiments.

Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

In some embodiments, an orthopedic component comprises a stem portion including a proximal end and a distal end, wherein the stem portion is configured to be inserted into a bone, an anatomical portion located at the proximal end of the stem portion, and a plate extending away from the stem portion such that a gap exists between the plate and the stem portion, wherein at least a portion of the plate extends toward the distal end of the stem portion.

Example 1. An orthopedic component, the orthopedic component comprising: a stem portion including a proximal end and a distal end, wherein the stem portion is configured to be inserted into a bone; an anatomical portion located at the proximal end of the stem portion; and a plate extending away from the stem portion such that a gap exists between the plate and the stem portion, wherein at least a portion of the plate extends toward the distal end of the stem portion.

Example 2. The orthopedic component of example 1, wherein the anatomical portion is one of a cup and a glenosphere.

Example 3. The orthopedic component of example 1 or example 2, wherein the plate is affixed to and extends from the anatomical portion.

Example 4. The orthopedic component of any one of examples 1-3, wherein the plate is affixed to the anatomical portion via a connecting wall.

Example 5. The orthopedic component of example 4, wherein the connecting wall includes at least one attachment hole.

Example 6. The orthopedic component of example 1 or example 2, wherein the plate is affixed to and extends from the stem portion.

Example 7. The orthopedic component of example 6, wherein the plate includes a forked feature, and wherein the forked feature interfaces with the stem portion.

Example 8. The orthopedic component of example 7, wherein the stem portion includes a slotted feature, and wherein the forked feature interfaces with the slotted feature.

Example 9. The orthopedic component of example 7 or example 8, further comprising a locking component, wherein the locking component includes a first hole, and the stem portion includes a corresponding second hole, wherein the first hole and the second hole are aligned to receive a fastener therethrough.

Example 10. The orthopedic component of example 7 or example 8, wherein the stem portion includes fastening aperture through which a fastener can mate with a corresponding hole of the plate, wherein adjustment of the aperture alters a dimension of the gap.

Example 11. The orthopedic component of any one of examples 1 to 3, wherein the anatomical portion and the plate are monolithically formed.

Example 12. The orthopedic component of any one of examples 1 to 11, wherein the plate extends toward the distal end of the stem portion substantially parallel to the stem portion.

Example 13. The orthopedic component of any one of examples 1 to 12, wherein a length of the plate is at least half as long as a length of the stem portion.

Example 14. The orthopedic component of any one of examples 1 to 6, wherein the plate extends to at least a midpoint of the stem portion.

Example 15. The orthopedic component of any one of examples 1 to 14, wherein the plate includes at least one attachment hole.

Example 16. The orthopedic component of any one of examples 1 to 15, wherein the plate includes at least one wing extending therefrom.

Example 17. The orthopedic component of example 16, wherein the at least one wing includes at least one attachment hole.

Example 18. The orthopedic component of example 16 or example 17, wherein the at least one wing is located on a proximal portion of the plate.

Example 19. The orthopedic component of example 16 or example 17, wherein the at least one wing is located on a distal portion of the plate.

Example 20. The orthopedic component of any one of examples 1 to 19, wherein the plate is located opposite the anatomical portion.

Example 21. The orthopedic component of any one of examples 1 to 19, wherein the plate is located on a side of the anatomical portion.

Example 22. The orthopedic component of any one of examples 1 to 21, wherein the plate includes a plurality of rows of holes, and wherein the stem portion includes a corresponding row of holes, wherein at least one row of the plurality of rows of holes aligns with the corresponding row of holes.

Example 23. The orthopedic component of example 22, wherein a plurality of fasteners are inserted through the at least one row of the plurality of holes and the corresponding row of holes.

Example 24. The orthopedic component of example 22 or example 23, wherein the stem portion includes a plurality of concave features, and wherein a second row of the plurality of rows of holes aligns with the concave features.

Example 25. The orthopedic component of example 24, wherein the second row of the plurality of rows of holes is configured to receive fasteners to secure the plate to a bone.

Example 26. The orthopedic component of any one of examples 1 to 25, wherein the plate includes a plurality of raised portions.

Example 27. The orthopedic component of any one of examples 1 to 26, wherein the plate extends opposite the anatomical portion, and wherein the plate includes a curve such that at least a portion of the plate is locate on a side of the anatomical component.

Example 28. The orthopedic component of any one of examples 1 to 27, wherein the stem portion is configured to be inserted into a bone.

Example 29. The orthopedic component of any one of examples 1 to 10 or example 12 to 28, wherein the plate is secured to the stem portion via a connector piece.

Example 30. An orthopedic component the orthopedic component comprising: a stem portion having a proximal end and a distal end, the distal end of the stem portion being adapted for insertion into a bone; an anatomical portion configured to mate with a corresponding structure, the anatomical portion being attached to the proximal end of the stem portion; a plate extending from the cup portion and disposed outwardly thereof to form a gap between the plate and the stem portion.

Example 31. The orthopedic component of example 30, wherein the plate includes a plurality of wings, wherein each wing of the plurality of wings includes at least one hole.

Example 32. The orthopedic component of example 30, wherein the plate includes at least one attachment hole.

Example 33. The orthopedic component of example 30, wherein the anatomical portion includes suture sites, wherein each of the suture sites includes at least one suture hole.

Example 34. The orthopedic component of example 30, wherein the plate is curved laterally so as to be concave towards the anatomical portion.

Example 35. The orthopedic component of example 34, wherein the plate is curved longitudinally.

Example 36. The orthopedic component of example 30, wherein the plate includes a downwardly depending flange.

Example 37. The orthopedic component of example 36, wherein the flange of the plate extends downwardly alongside a part of the stem portion.

Example 38. The orthopedic component of example 36, wherein the flange includes a plurality of wings, wherein each wing of the plurality of wings includes at least one attachment hole.

Example 39. The orthopedic component of example 30, wherein the plate is attached to the anatomical portion by a connecting wall.

Example 40. The orthopedic component of example 39, wherein the connecting wall includes at least one suture hole.

Example 41. The orthopedic component of example 39, wherein the connecting wall is generally planar.

Example 42. The orthopedic component of example 39, wherein a diameter of the anatomical portion lies within the plane of the connecting wall.

Example 43. An orthopedic component, wherein the orthopedic component comprises: a stem portion having a proximal end and a distal end, the distal end of the stem portion configured to be inserted into a bone; an anatomical portion a corresponding structure, the anatomical portion being attached to the proximal end of the stem portion; a plate that projects from the anatomical portion, wherein the plate includes an outer surface that is contoured.

Example 44. The orthopedic component of example 43, wherein the orthopedic component is monolithically formed.

Example 45. The orthopedic component of example 43, wherein the plate includes a flange that extends downwardly alongside a part of the stem portion.

Example 46. The orthopedic component of example 43, wherein the plate includes at least one attachment hole.

Example 47. The orthopedic component of example 43, wherein the anatomical portion is a cup, and wherein the cup includes a socket that is adapted to receive a ball portion of a glenoid component.

Example 48. The orthopedic component of example 47, wherein the cup includes suture sites, each of which is provided with at least one suture hole.

Example 49. An orthopedic component, the orthopedic component comprising: a stem portion having a proximal end and a distal end, said proximal end of said stem portion having a plate configured to be located outside of a bone, wherein the distal end of the stem portion is configured for insertion into a bone; an anatomical portion being configured to mate with a corresponding structure, the anatomical portion attached to the proximal end of the stem portion; a plate that is attached to the anatomical portion and disposed outwardly thereof, the plate having an outer surface that is spaced from the anatomical portion and contoured.

Example 50. The orthopedic component of example 49, wherein the stem portion has at least one fastener hole.

Example 51. The orthopedic component of example 49, wherein the stem portion has at least one concave feature along its outer edge adapted to allow passage of a fastener.

Example 52. The orthopedic component of example 49, wherein the stem portion has at least one flute along its length.

Example 53. The orthopedic component of example 49, wherein the stem portion has a tapered socket.

Example 54. The orthopedic component of example 49, wherein the stem portion has a cutout that is shaped to provide rotational stability to the anatomical portion.

Example 55. The orthopedic component of example 49, wherein the plate extends downwardly alongside a part of the stem portion.

Example 56. The orthopedic component of example 49, wherein the plate includes at least one fastener hole.

Example 57. The orthopedic component of example 49, wherein the anatomical portion includes at least one attachment hole.

Example 58. The orthopedic component of example 49, wherein the cup portion has at least one wing structure, each of which is provided with at least one attachment hole.

Example 59. The orthopedic component of example 49, wherein the anatomical portion is shaped to provide rotational stability when attached to the stem portion.

Example 60. The orthopedic component of example 49, wherein the anatomical portion has a tapered trunnion.

Example 61. The orthopedic component of example 49 wherein the plate includes at least one attachment hole.

Example 62. The orthopedic component of example 49, wherein the plate includes a plurality of wings, wherein each wing of the plurality of wings includes at least one attachment hole.

Example 63. The orthopedic component of example 49, wherein the plate includes at least one raised feature.

Example 64. The orthopedic component of example 49 wherein the plate is curved laterally so as to be concave towards the anatomical portion.

Example 65. The orthopedic component of example 64, wherein the plate is curved longitudinally.

Example 66. The orthopedic component of example 49, wherein the plate includes a downwardly depending flange.

Example 67. The orthopedic component of example 66, wherein the flange of the plate extends downwardly alongside at least a portion of the stem portion.

Example 68. The orthopedic component of example 66, wherein the flange includes a plurality of wings, wherein each wing of the plurality of wings includes at least one attachment hole.

Example 69. The orthopedic component of example 49, wherein the plate is attached to the anatomical portion by a connecting wall.

Example 70. The orthopedic component of example 69, wherein the connecting wall includes at least one suture hole.

Example 71. The orthopedic component of example 69, wherein the connecting wall is generally planar.

Example 72. The orthopedic component of example 71, wherein a diameter of the anatomical portion lies within the plane of the connecting wall.

Example 73. An orthopedic component, the orthopedic component comprising: a stem portion having a proximal end and a distal end, said proximal end of said stem portion having an anatomical portion that is configured to mate with a corresponding structure, wherein the distal end of the stem portion is configured for insertion into bone; a connector piece having a proximal end and a distal end, the proximal end of the connector piece adapted to attach to the anatomical portion and allow the stem portion to pass through, wherein a distal end of the connector piece is configured for insertion into the bone; a plate disposed outwardly from the stem portion, wherein the plate includes outer surface that is spaced from the stem portion.

Example 74. The orthopedic component of example 73, wherein the stem portion has at least one fastener hole.

Example 75. The orthopedic component of example 73, wherein the stem portion has at least one concave feature along its outer edge adapted to allow passage of a fastener.

Example 76. The orthopedic component of example 73, wherein the stem portion has at least one flute along its length.

Example 77. The orthopedic component of example 73, wherein the stem portion has a tapered socket.

Example 78. The orthopedic component of example 73, wherein the stem portion has a cutout that is shaped to provide rotational stability to an attached cup portion.

Example 79. The orthopedic component of example 73, wherein the humerus support structure extends downwardly alongside a part of the stem portion.

Example 80. The orthopedic component of example 73, wherein the plate includes at least one fastener hole.

Example 81. The orthopedic component of example 73, wherein the anatomical portion has at least one attachment hole.

Example 82. The orthopedic component of example 73, wherein the anatomical portion has at least one wing structure, wherein the at least one wing structure includes at least one attachment hole.

Example 83. The orthopedic component of example 73, wherein the connector piece has a cutout that is shaped to provide rotational stability to the anatomical portion.

Example 84. The orthopedic component of example 73, wherein the connector piece has a trunnion that is shaped to provide rotational stability when inserted into the bone.

Example 85. The orthopedic component of example 73, wherein the connector piece has a tapered socket for attachment of the anatomical portion.

Example 86. The orthopedic component of example 73, wherein the connector piece has at least one fastener hole.

Example 87. The orthopedic component of example 73, wherein the plate includes at least one attachment hole.

Example 88. The orthopedic component of example 73, wherein the plate includes a plurality of wings, wherein each wing of the plurality of wings includes at least one attachment hole.

Example 89. The orthopedic component of example 73, wherein the plate includes at least one attachment hole.

Example 90. The orthopedic component of example 73, wherein the plate is curved laterally so as to be concave towards the anatomical portion.

Example 91. The orthopedic component of example 90, wherein the plate is curved longitudinally.

Example 92. The orthopedic component of example 73, wherein the plate includes a downwardly depending flange.

Example 93. The orthopedic component of example 92, wherein the flange extends downwardly alongside a part of the stem portion.

Example 94. The orthopedic component of example 92, wherein the flange includes a plurality of wings, wherein each wing of the plurality of wings includes at least one attachment hole.

Example 95. The orthopedic component of example 73, wherein the plate is attached to the anatomical portion by a connecting wall.

Example 96. The orthopedic component of example 95, wherein the connecting wall includes at least one suture hole.

Example 97. The orthopedic component of example 66, wherein the connecting wall is generally planar connecting.

Example 98. The orthopedic component of example 97, wherein a diameter of the anatomical portion lies within the plane of the generally planar connecting wall.

Example 99. A humeral component of a prosthetic assembly for use in repairing or reconstructing a joint between a humerus and a scapula by cooperating with a ball portion of a glenoid component that is adapted for attachment to a scapula, said humeral component comprising: a stem portion having a proximal end and a distal end, said proximal end of said stem portion being adapted to receive a humerus support component, and said distal end of said stem portion being adapted for insertion into the humerus; a humerus support having a proximal end and a distal end, said proximal end of said humerus support adapted to be fastened to a stem portion, and said distal end of said humerus support having a humerus support structure being adapted for placement outside of the humerus; a cup portion that is adapted to receive the ball portion of the glenoid component, said cup portion being attached to the proximal end of the stem portion; a deltoid support integrated into the cup portion, said deltoid support having an outer surface contoured so that the deltoid muscle may be placed thereover.

Example 100. The humeral component of example 99, wherein the stem portion has at least one fastener hole.

Example 101. The humeral component of example 99, wherein the stem portion has at least one concave feature along its outer edge adapted to allow passage of a fastener.

Example 102. The humeral component of example 99 wherein the stem portion has at least one flute along its length.

Example 103. The humeral component of example 99, wherein the stem portion has a tapered socket.

Example 104. The humeral component of example 99, wherein the stem portion has a cutout that is shaped to provide rotational stability to an attached cup portion.

Example 105. The humeral component of example 99 wherein the stem portion has a fastening feature to secure a humerus support.

Example 106. The humeral component of example 99, wherein the humerus support has at least one fastener hole.

Example 107. The humeral component of example 99, wherein the humerus support is shaped to attach to a stem portion.

Example 108. The humeral component of example 99, wherein the cup portion has at least one attachment hole.

Example 109. The humeral component of example 99, wherein the cup portion has at least one wing structure, each of which is provided with at least one attachment hole.

Example 110. The humeral component of example 99, wherein the cup portion is shaped to provide rotational stability when attached to a stem portion.

Example 111. The humeral component of example 99, wherein the cup portion has a tapered trunnion.

Example 112. The humeral component of example 99 wherein the deltoid support includes at least one attachment hole.

Example 113. The humeral component of example 99 wherein the deltoid support includes a plurality of wings, each of which is provided with at least one attachment hole.

Example 114. The humeral component of example 99 wherein the deltoid support includes at least one attachment hole.

Example 115. The humeral component of example 99, wherein the deltoid support is curved laterally so as to be concave towards the cup portion.

Example 116. The humeral component of example 115, wherein the deltoid support is curved longitudinally.

Example 117. The humeral component of example 99, wherein the deltoid support includes a downwardly depending flange.

Example 118. The humeral component of example 117, wherein the flange of the deltoid support extends downwardly alongside a part of the stem portion.

Example 119. The humeral component of example 117, wherein the flange includes a plurality of wings, each of which is provided with at least one attachment hole.

Example 120. The humeral component of example 99, wherein the deltoid support includes a downwardly depending flange that follows multiple axes.

Example 121. The humeral component of example 99, wherein the deltoid support includes grooved structures to aid in attachment to the humerus.

Example 122. The humeral component of example 99, wherein the deltoid support is attached to the cup portion by a connecting wall.

Example 123. The humeral component of example 122, wherein the connecting wall includes at least one suture hole.

Example 124. The humeral component of example 99, wherein the deltoid support is attached to the cup portion by a generally planar connecting wall.

Example 125. The humeral component of example 124, wherein a diameter of the cup lies within the plane of the generally planar connecting wall.

Those skilled in the art will recognize that a wide variety of other modifications, alterations, and combinations can also be made with respect to the above described embodiments without departing from the scope of the disclosure, and that such modifications, alterations, and combinations are to be viewed as being within the ambit of the inventive concept.

What is claimed is:

1. An orthopedic component, the orthopedic component comprising:
    a stem portion including a proximal end and a distal end, wherein the stem portion is configured to be inserted into a bone, and wherein stem portion includes a fastening aperture through which a fastener can mate with a corresponding hole of the plate and wherein adjustment of the aperture alters a dimension of a gap between the stem portion and a plate;
    an anatomical portion located at the proximal end of the stem portion; and
    the plate extending away from the stem portion such that the gap exists between the stem portion and the plate, wherein at least a portion of the plate extends toward the distal end of the stem portion;
    wherein the plate includes a forked feature, and wherein the forked feature interfaces with the stem portion.

2. The orthopedic component of claim 1, wherein the stem portion includes a slotted feature, and wherein the forked feature interfaces with the slotted feature.

3. The orthopedic component of claim 1, further comprising a locking component, wherein the locking component includes a first hole, and the stem portion includes a corresponding second hole, wherein the first hole and the second hole are aligned to receive a fastener therethrough.

4. The orthopedic component of claim 1, wherein the stem portion includes at least one concave feature, and the plate includes a row of holes wherein the row of holes aligns with at least one concave feature.

5. The humeral component of claim 1, wherein the stem portion has at least one fastener hole.

6. An orthopedic component, the orthopedic component comprising:
- a stem portion having a proximal end and a distal end, the distal end of the stem portion being adapted for insertion into a bone;
- an anatomical portion configured to mate with a corresponding structure, the anatomical portion being attached to the proximal end of the stem portion;
- a plate extending from the anatomical portion and disposed outwardly thereof to form a gap between the plate and the stem portion, wherein the plate is attached to the anatomical portion by a connecting wall, and wherein the connecting wall includes at least one suture hole;
- wherein the anatomical portion includes suture sites, wherein each of the suture sites includes at least one suture hole.

7. The orthopedic component of claim 6, wherein the plate includes a downwardly depending flange that includes a plurality of wings, wherein each wing of the plurality of wings includes at least one attachment hole.

8. The orthopedic component of claim 6, wherein the anatomical portion is a cup.

9. The orthopedic component of claim 6, wherein the anatomical portion is a cup, and the cup has at least one wing structure, each of which is provided with at least one attachment hole.

10. An orthopedic component, the orthopedic component comprising:
- a stem portion having a proximal end and a distal end, said proximal end of said stem portion having an anatomical portion that is configured to mate with a corresponding structure, wherein the distal end of the stem portion is configured for insertion into bone, and wherein a distal end of the anatomical portion includes a trunnion;
- a connector piece having a proximal end and a distal end, the proximal end of the connector piece including a tapered socket for attachment of the anatomical portion via the trunnion and allow the stem portion to pass through from the distal end of the connector piece beyond the proximal end of the connector piece, wherein the distal end of the connector piece is configured for insertion into the bone;
- a plate disposed outwardly from the stem portion, wherein the plate includes an outer surface that is spaced from the stem portion.

11. The orthopedic component of claim 10, wherein the stem portion has at least one flute along its length.

12. The orthopedic component of claim 10, wherein the wherein the trunnion is tapered.

13. The orthopedic component of claim 10, wherein the connector piece has a trunnion that is shaped to provide rotational stability when inserted into the bone.

14. The orthopedic component of claim 10, wherein the connector piece has at least one fastener hole.

15. The orthopedic component of claim 10, wherein the plate is curved laterally so as to be concave towards the anatomical portion.

16. The orthopedic component of claim 15, wherein the plate is curved longitudinally.

* * * * *